(12) United States Patent
Hwang et al.

(10) Patent No.: US 11,259,152 B2
(45) Date of Patent: Feb. 22, 2022

(54) V2X COMMUNICATION DEVICE, AND ITS MESSAGE TRANSMISSION AND RECEPTION METHOD FOR V2X COMMUNICATION DEVICE

(71) Applicant: LG ELECTRONICS INC., Seoul (KR)

(72) Inventors: Jaeho Hwang, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/768,984

(22) PCT Filed: Dec. 29, 2017

(86) PCT No.: PCT/KR2017/015761
§ 371 (c)(1),
(2) Date: Jun. 2, 2020

(87) PCT Pub. No.: WO2019/132081
PCT Pub. Date: Jul. 4, 2019

(65) Prior Publication Data
US 2021/0227356 A1    Jul. 22, 2021

(51) Int. Cl.
*H04W 4/40*    (2018.01)
*H04W 4/12*    (2009.01)
(Continued)

(52) U.S. Cl.
CPC ............... *H04W 4/12* (2013.01); *H04W 4/40* (2018.02); *H04W 4/90* (2018.02); *H04W 72/042* (2013.01); *H04W 72/0446* (2013.01)

(58) Field of Classification Search
CPC ......... H04W 4/40; H04W 4/46; H04W 76/14; H04W 40/22; H04W 4/06; H04W 4/70;
(Continued)

(56) References Cited

U.S. PATENT DOCUMENTS 7,027,773 B1    4/2006  McMillin
8,965,677 B2 *  2/2015  Breed ................... G01S 17/86
                                                   701/301
(Continued)

FOREIGN PATENT DOCUMENTS

KR    101075021    10/2011
KR    101567212    11/2015
(Continued)

OTHER PUBLICATIONS

Lee Deuk, et al., "An efficient SCH utilization scheme for IEEE 1609.4 multi-channel environments in VANETs," 2016 IEEE International Conference on Communications (ICC), IEEE, May 22, 2016, pp. 1-6, XP032922261, pp. 1-3.
(Continued)

*Primary Examiner* — Jean A Gelin
(74) *Attorney, Agent, or Firm* — Dentons US LLP

(57) ABSTRACT

A method by which a V2X communication device receives an ITS message is disclosed. The ITS message reception method for the V2X communication device can comprise the steps of: accessing a control channel (CCH); receiving a first ITS message including EAS information from the CCH; and acquiring the EAS information from the first ITS message, wherein the first ITS message can include a rich media information field including information on rich media related with the EAS information, and the rich media information field can include transmission type information indicating a data transmission type of the rich media and channel information indicating an ITS channel through which data of the rich media is transmitted.

14 Claims, 26 Drawing Sheets

(51) Int. Cl.
  *H04W 4/90* (2018.01)
  *H04W 72/04* (2009.01)
(58) Field of Classification Search
  CPC ... H04W 72/005; H04W 72/02; H04W 76/27; H04W 8/005; H04W 4/44; H04W 76/23
  See application file for complete search history.

(56) References Cited

U.S. PATENT DOCUMENTS

| | | | | |
|---|---|---|---|---|
| 2013/0272148 | A1* | 10/2013 | Fong | H04W 28/0226 370/252 |
| 2014/0119251 | A1* | 5/2014 | Park | H04W 76/14 370/310 |
| 2015/0109989 | A1* | 4/2015 | Hu | H04W 4/06 370/312 |
| 2015/0111519 | A1* | 4/2015 | Li | H04W 76/50 455/404.1 |
| 2015/0115519 | A1* | 4/2015 | Takezawa | B65H 3/0669 271/117 |
| 2016/0135170 | A1* | 5/2016 | Chen | H04L 5/0082 370/336 |
| 2018/0132208 | A1* | 5/2018 | Pan | H04W 72/0406 |
| 2018/0317067 | A1* | 11/2018 | Ameixieira | H04W 76/10 |
| 2018/0322782 | A1* | 11/2018 | Engel | G08G 1/163 |
| 2018/0376306 | A1* | 12/2018 | Ramalho de Oliveira | G08G 1/0967 |
| 2019/0068434 | A1* | 2/2019 | Moreira da Mota | H04L 43/08 |
| 2019/0090099 | A1* | 3/2019 | Wang | H04W 4/021 |
| 2019/0208387 | A1* | 7/2019 | Jiang | H04W 72/044 |
| 2019/0306680 | A1* | 10/2019 | Doggart | H04L 67/18 |
| 2019/0364492 | A1* | 11/2019 | Azizi | H04W 52/0264 |
| 2020/0053527 | A1* | 2/2020 | Nylander | H04W 4/046 |
| 2020/0120458 | A1* | 4/2020 | Aldana | H04W 36/08 |
| 2020/0137536 | A1* | 4/2020 | Nguyen | H04W 72/005 |

FOREIGN PATENT DOCUMENTS

| | | |
|---|---|---|
| KR | 101603436 | 3/2016 |
| WO | 2017048100 | 3/2017 |

OTHER PUBLICATIONS

"Intelligent Transport Systems; European profile standard on the physical and medium access layer of 5 GHz ITS," ETSI Draft; ITSWG4-05D007_ES_202_663, European Telecommunications Standards Institute (ETSI), 650, Route Des Lucioles, F-06921 Sophia-Antipolis, France, No. V0.0.2, Dec. 21, 2008, pp. 1-44, XP014074835, pp. 10-12.

* cited by examiner

【Figure 1】
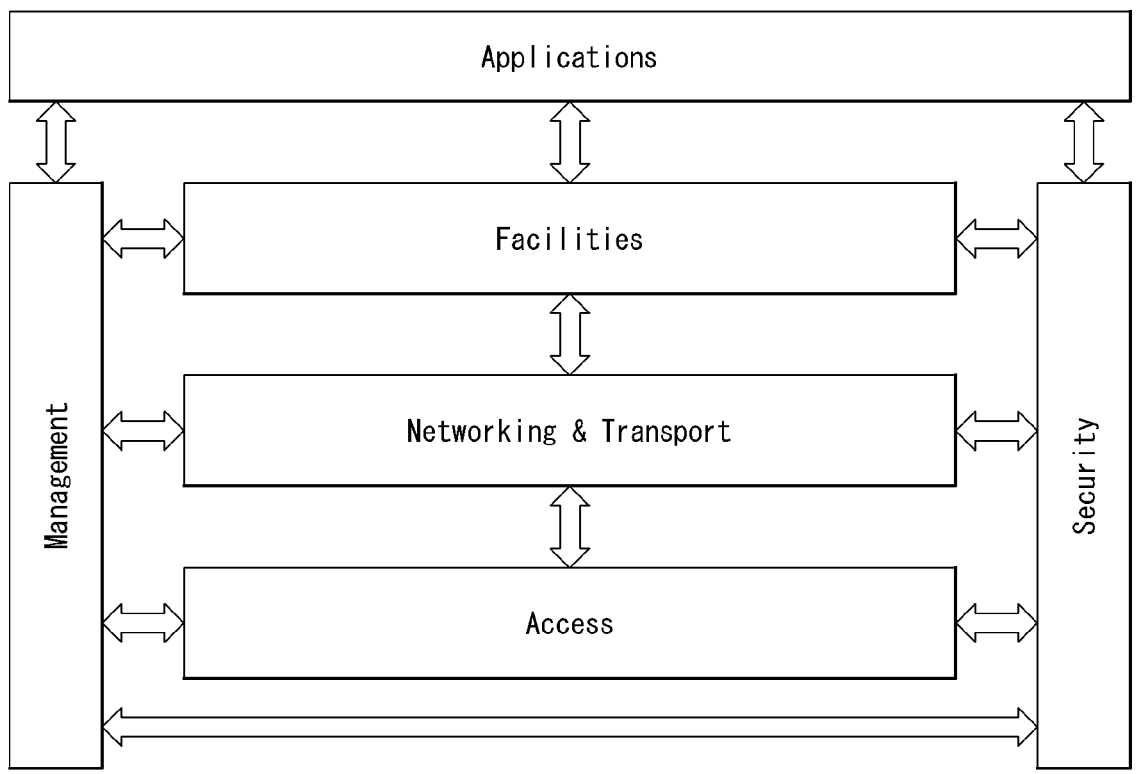

[Figure 2]
Networking & Transport
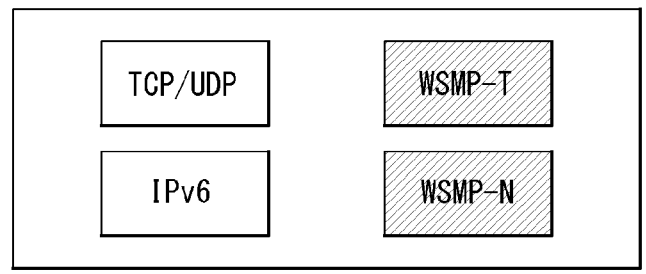
(a)
Networking & Transport
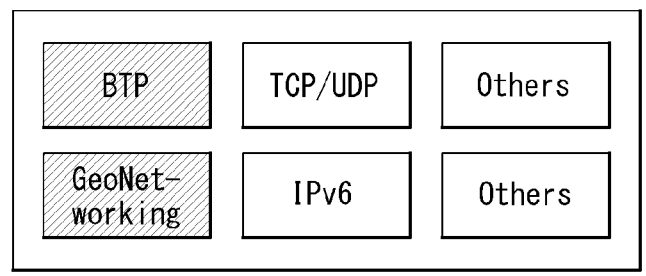
(b)

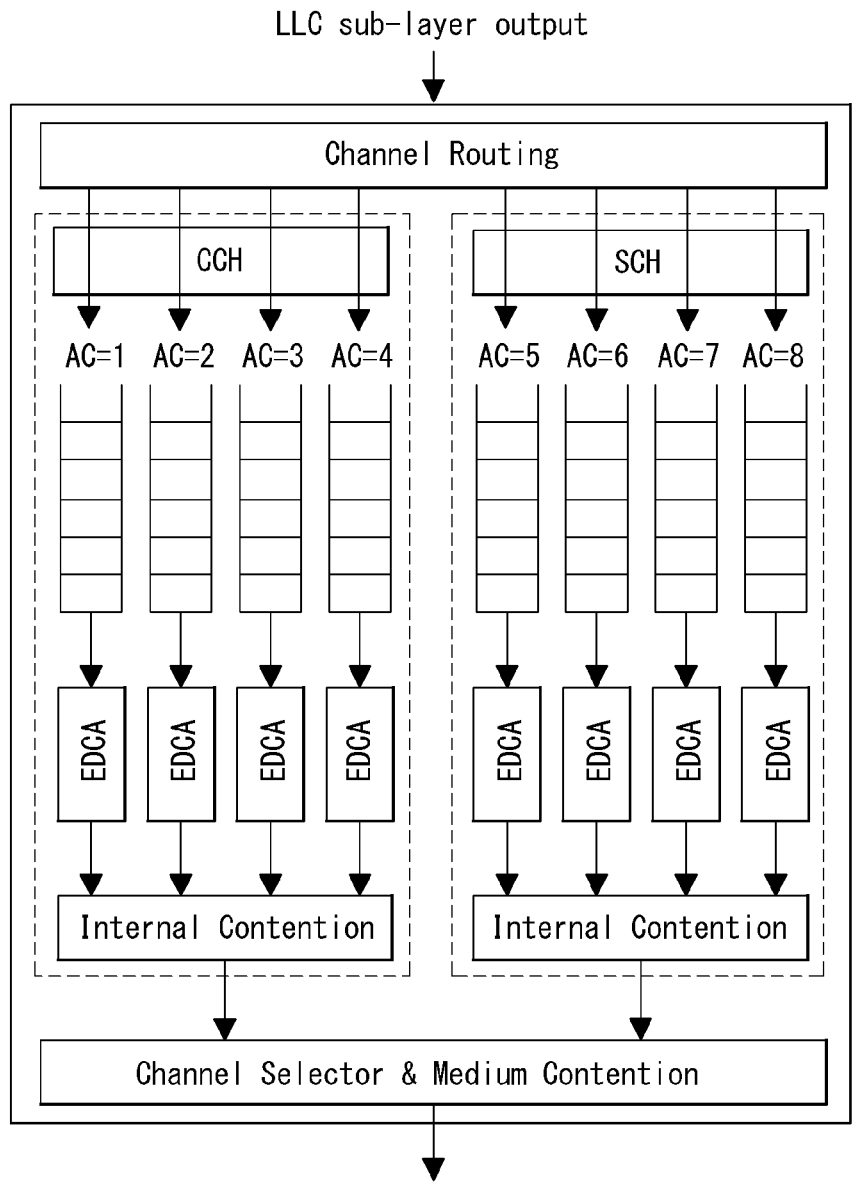
[Figure 3]

【Figure 4】
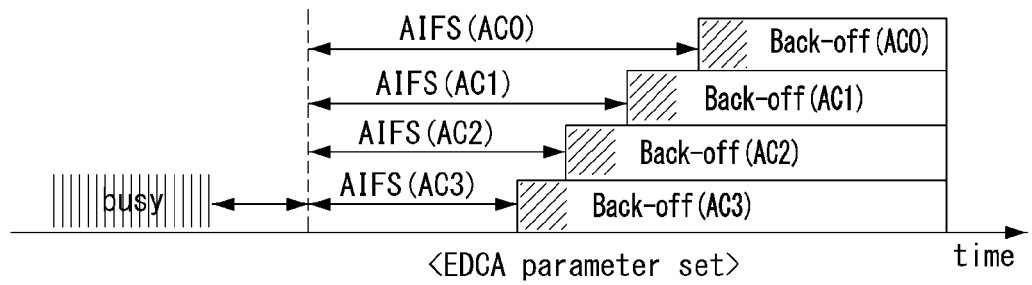
【Figure 5】
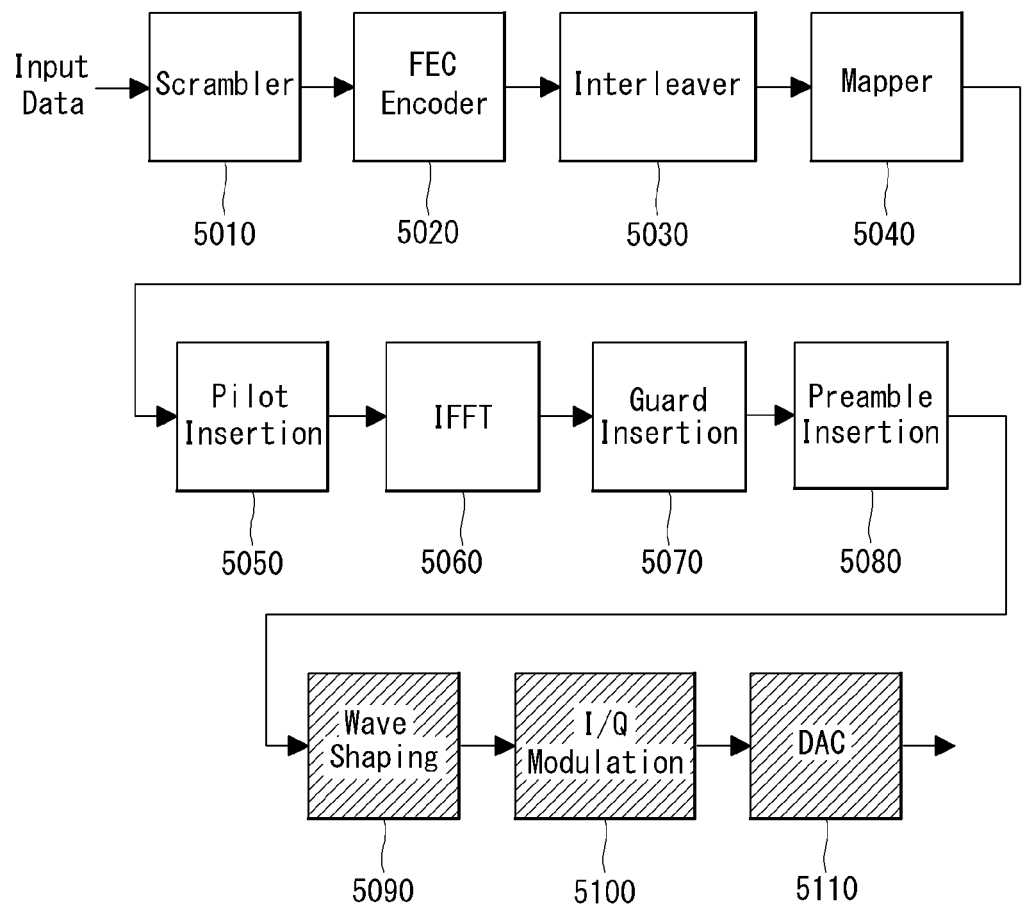

[Figure 6]
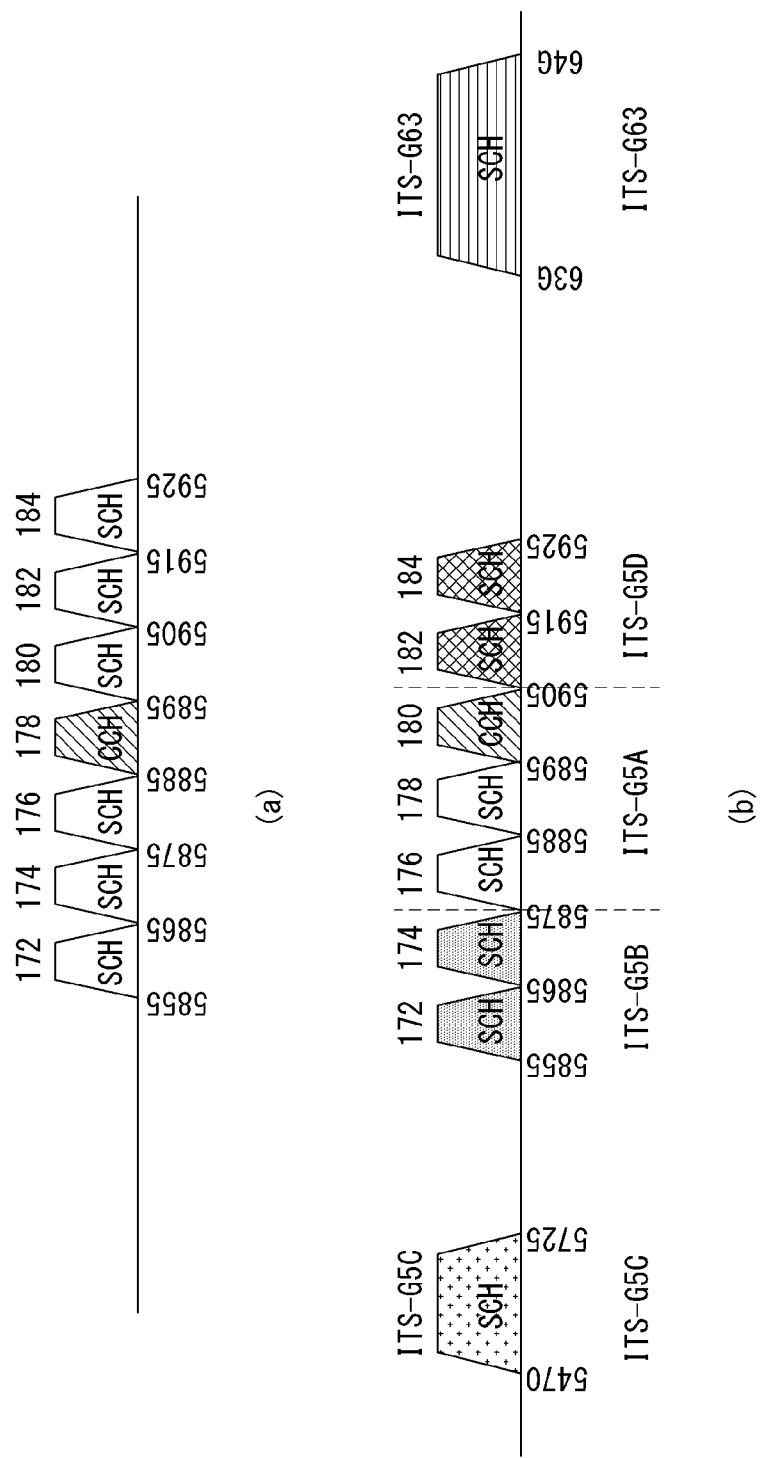

[Figure 7]
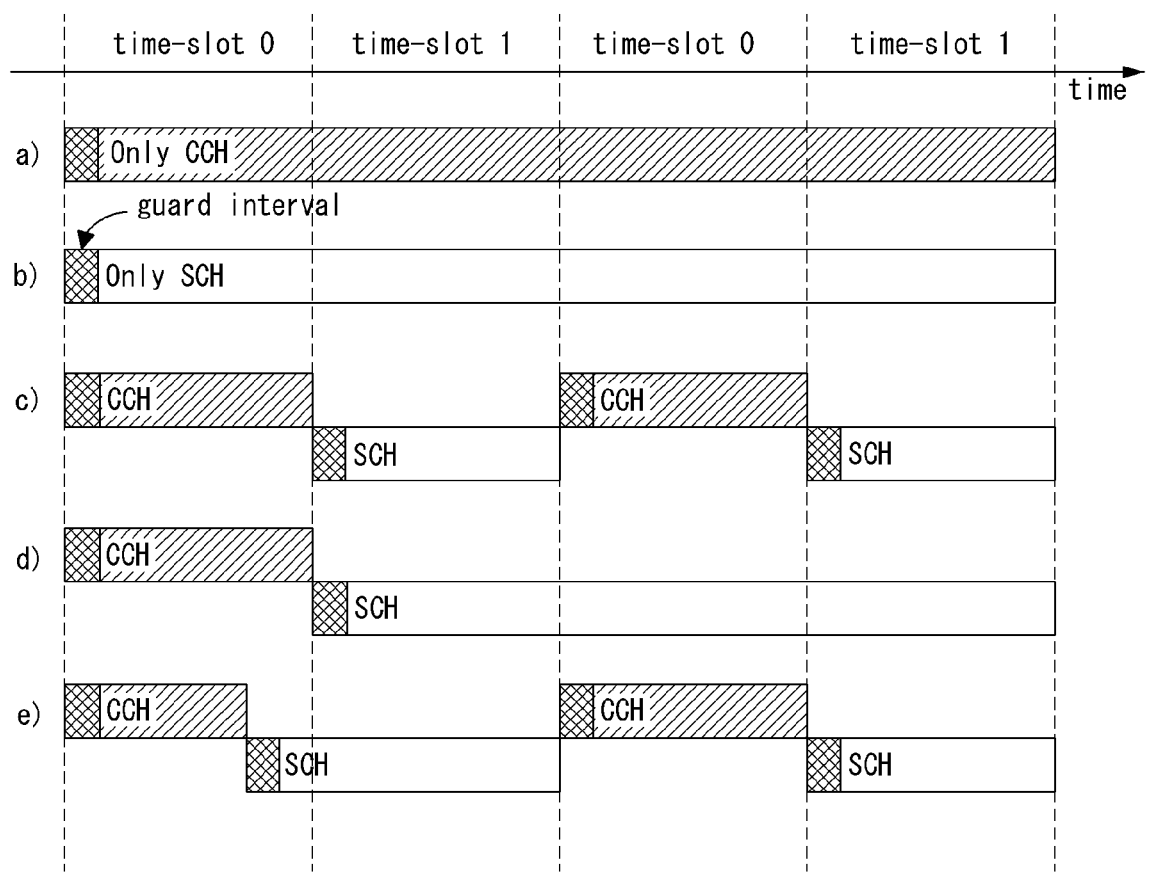

【Figure 8】
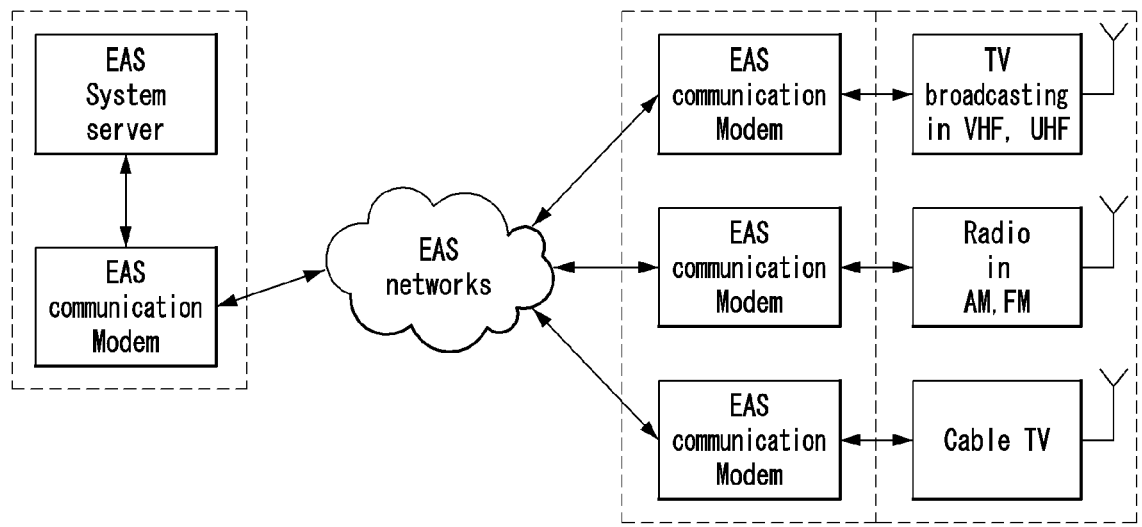
【Figure 9】
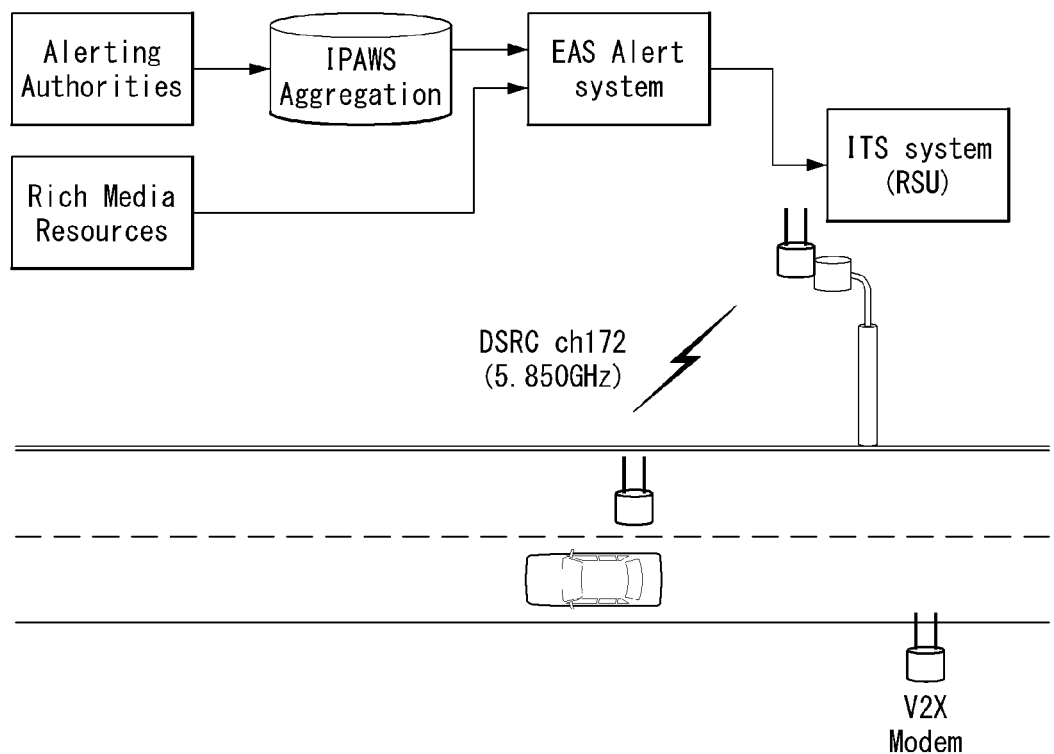

[Figure 10]
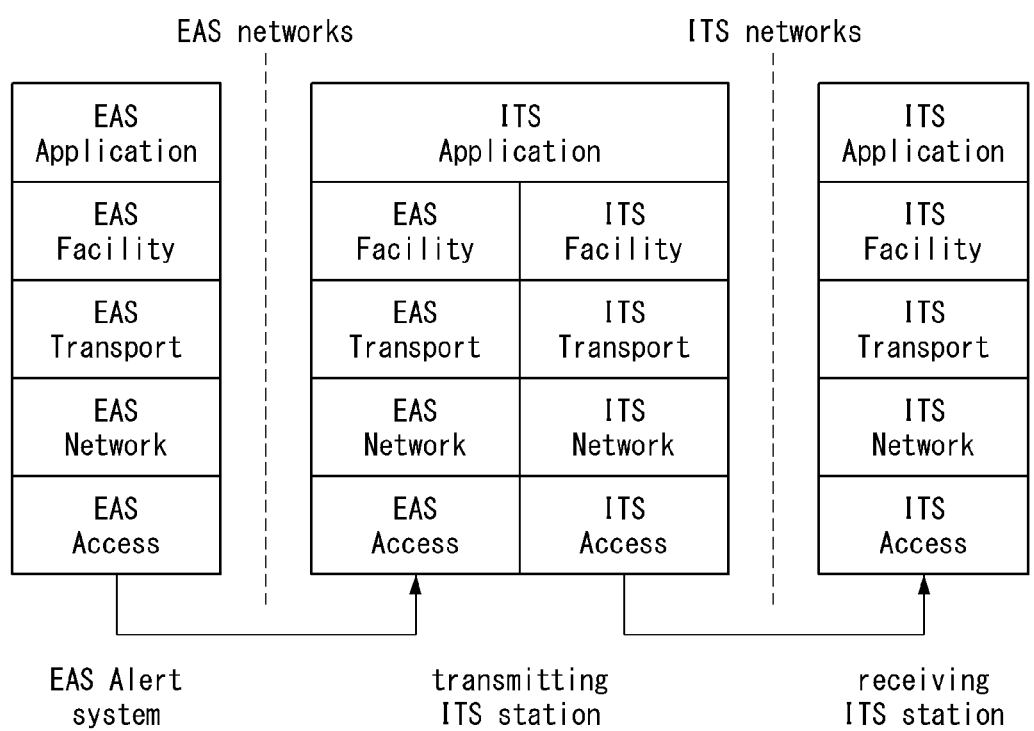

【Figure 11】
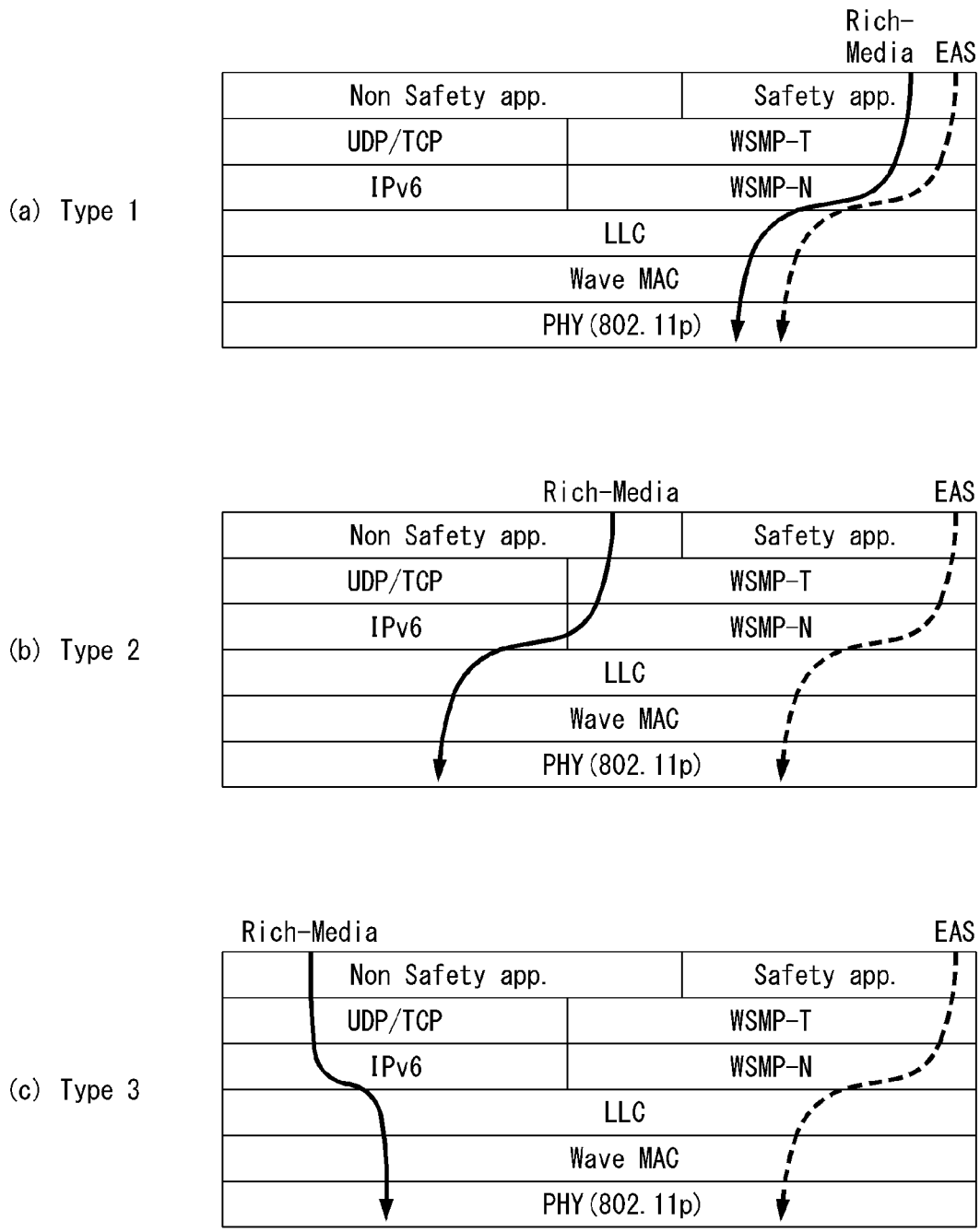

【Figure 12】
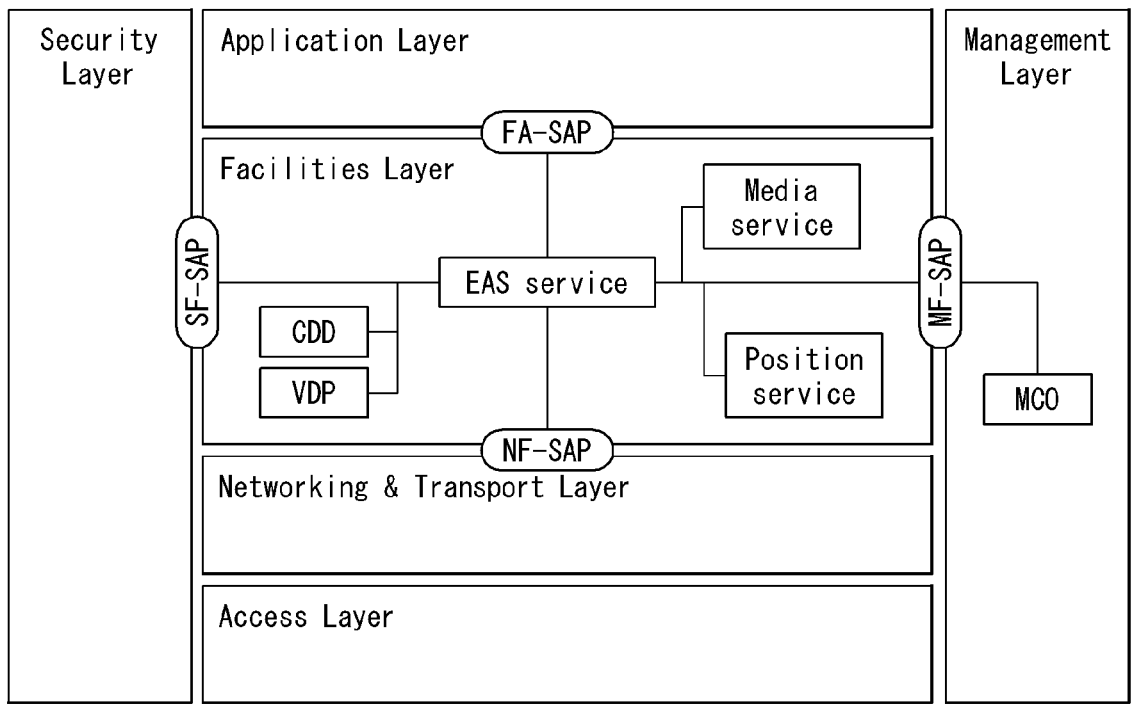
【Figure 13】
(a)
(b)

[Figure 14]
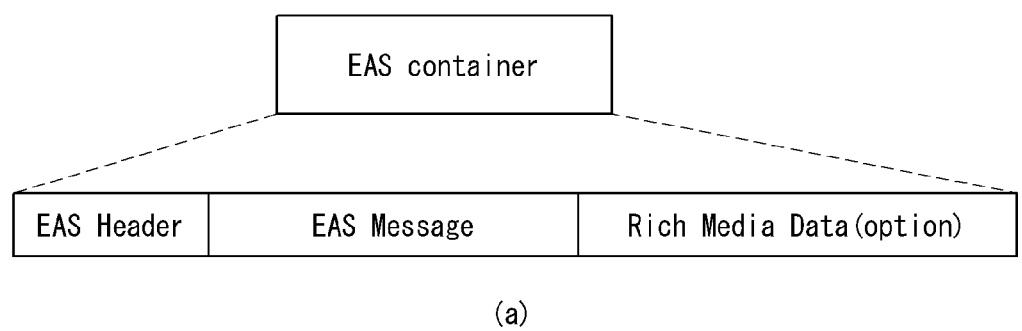
(a)
| ASN.1 Representation | |
|---|---|
| DF_EAS_Header | ::=SEQUENCE { |
| EAS_Header | DF_EASHeader |
| EAS_Message | DF_EASmessage |
| RichMediaData | ::=OCTET STRING (SIZE(1..2000)) OPTION |
| } | |
(b)

【Figure 15】
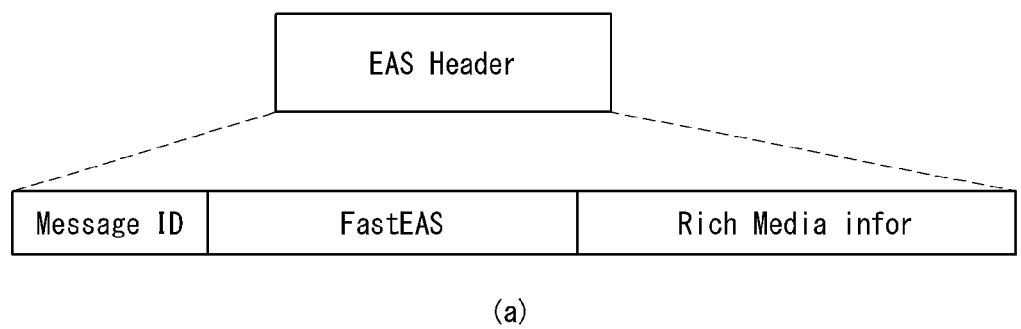
(a)
| ASN.1 Representation | |
|---|---|
| DF_EAS_Header | ::=SEQUENCE { |
|   MessageID | DF_MessageID |
|   FastEAS | DF_FastEAS |
|   RichMediaInfor | DF_RMinfor |
| } | |
(b)

[Figure 16]
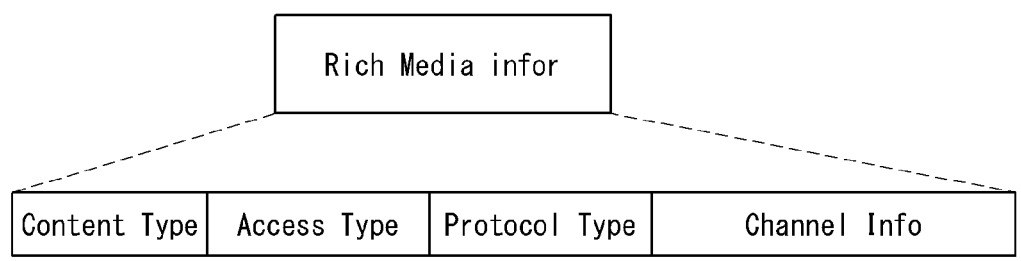
(a)
| ASN.1 Representation | |
|---|---|
| DF_EASPayload | ::=SEQUENCE { |
| Content Type | DE_RichMediaContentType |
| Access Type | DE_RichMediaAccessType |
| Protocol Type | DE_RichMediaProtocolType |
| Channel Info | DE_RichMediaChannelInfo |
| } | |
(b)

【Figure 17】
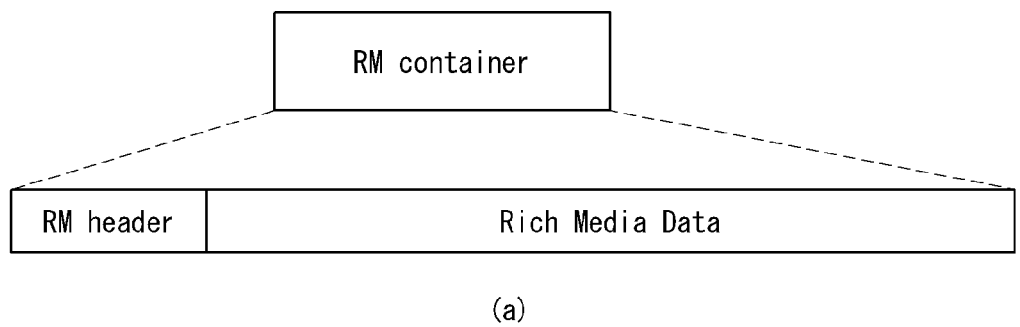
(a)
| ASN.1 Representation | |
|---|---|
| DF_RM_Container | ::=SEQUENCE { |
|   RM_Header | DF_RichMediaHeader |
|   RichMediaData | ::=OCTET STRING  (SIZE(1..5000))  OPTION |
| } | |
(b)

【Figure 18】
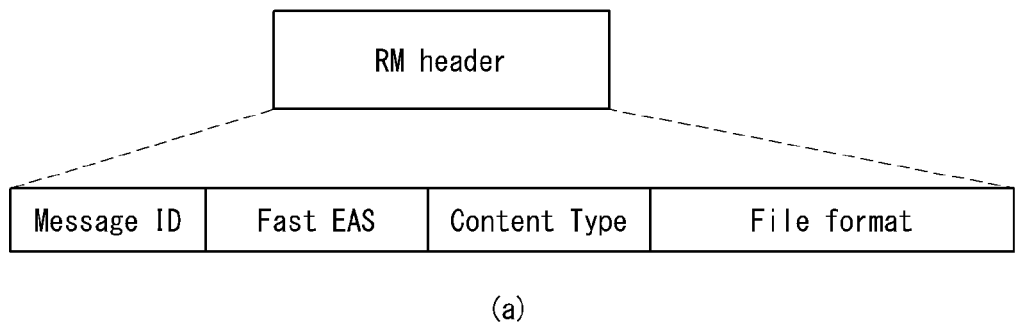
(a)
| ASN.1 Representation | |
|---|---|
| DF_EAS_Header | ::=SEQUENCE { |
| MessageID | DF_MessageID |
| FastEAS | DF_FastEAS |
| ContentType | DF_ContentType |
| FileFormat | DF_FileFormat |
| } | |
(b)
【Figure 19】
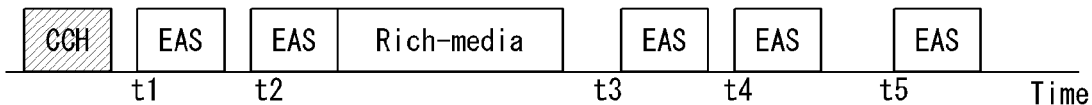

[Figure 20]
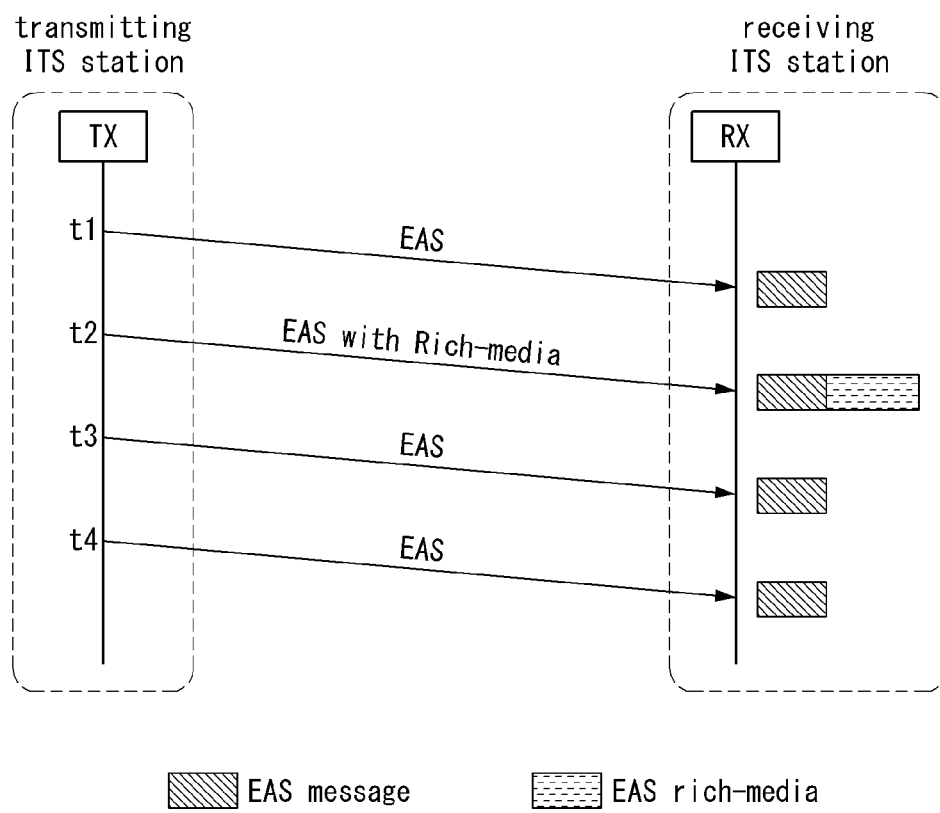

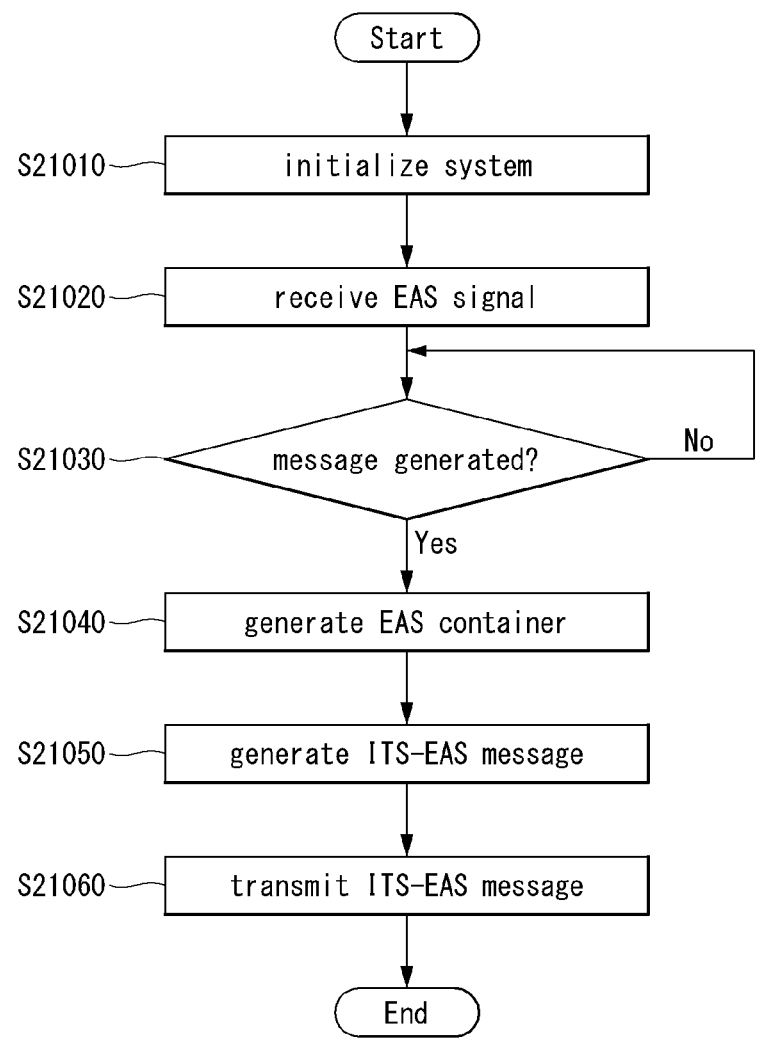
【Figure 21】

[Figure 22]
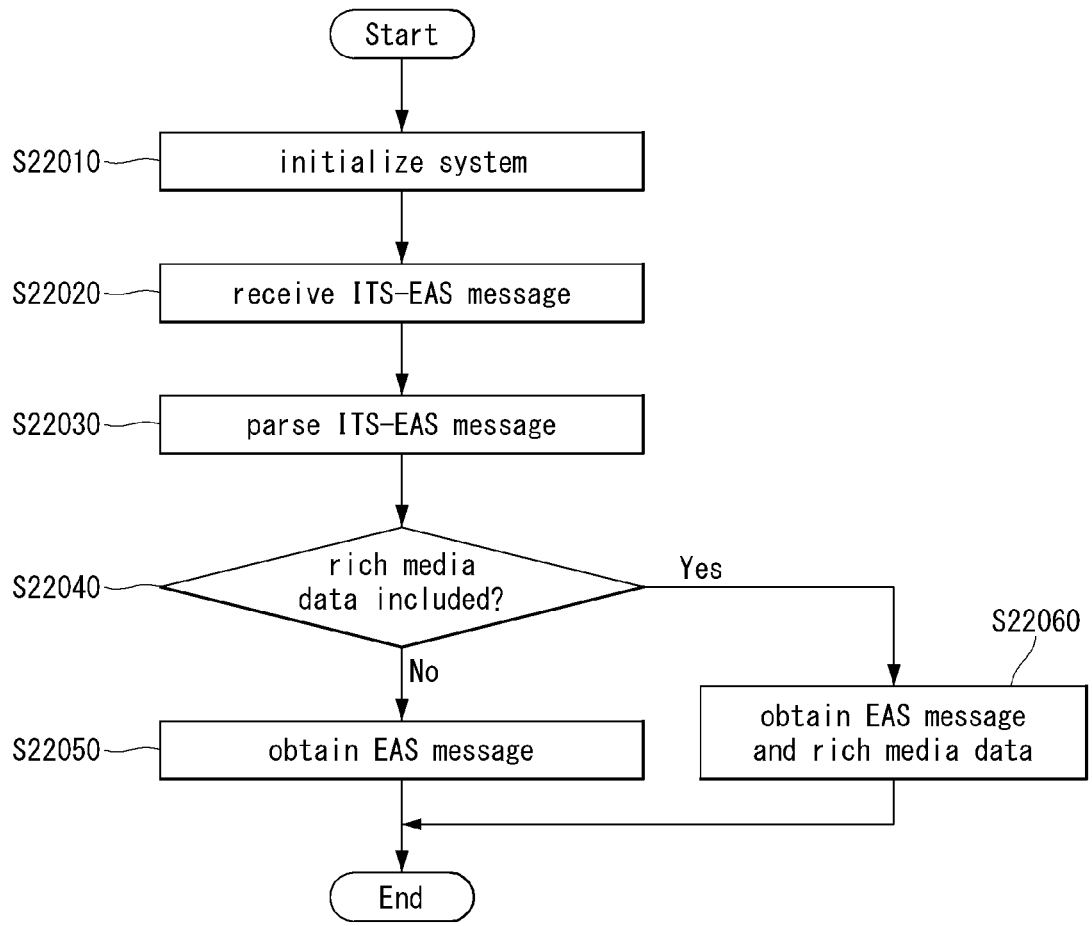
[Figure 23]
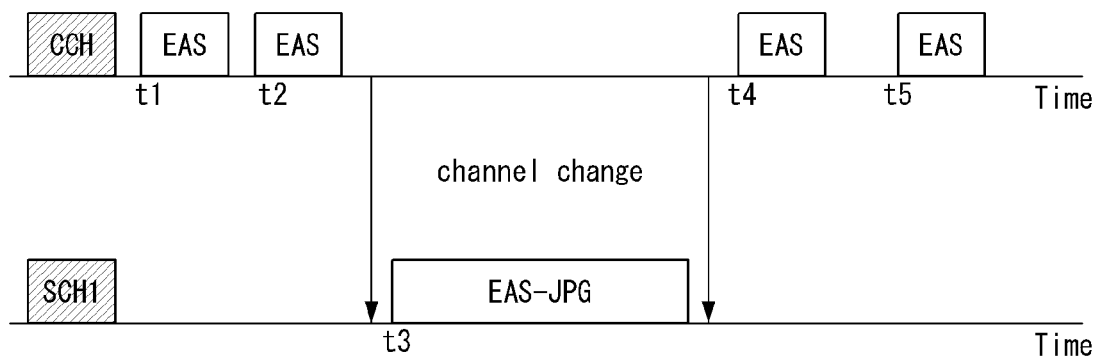

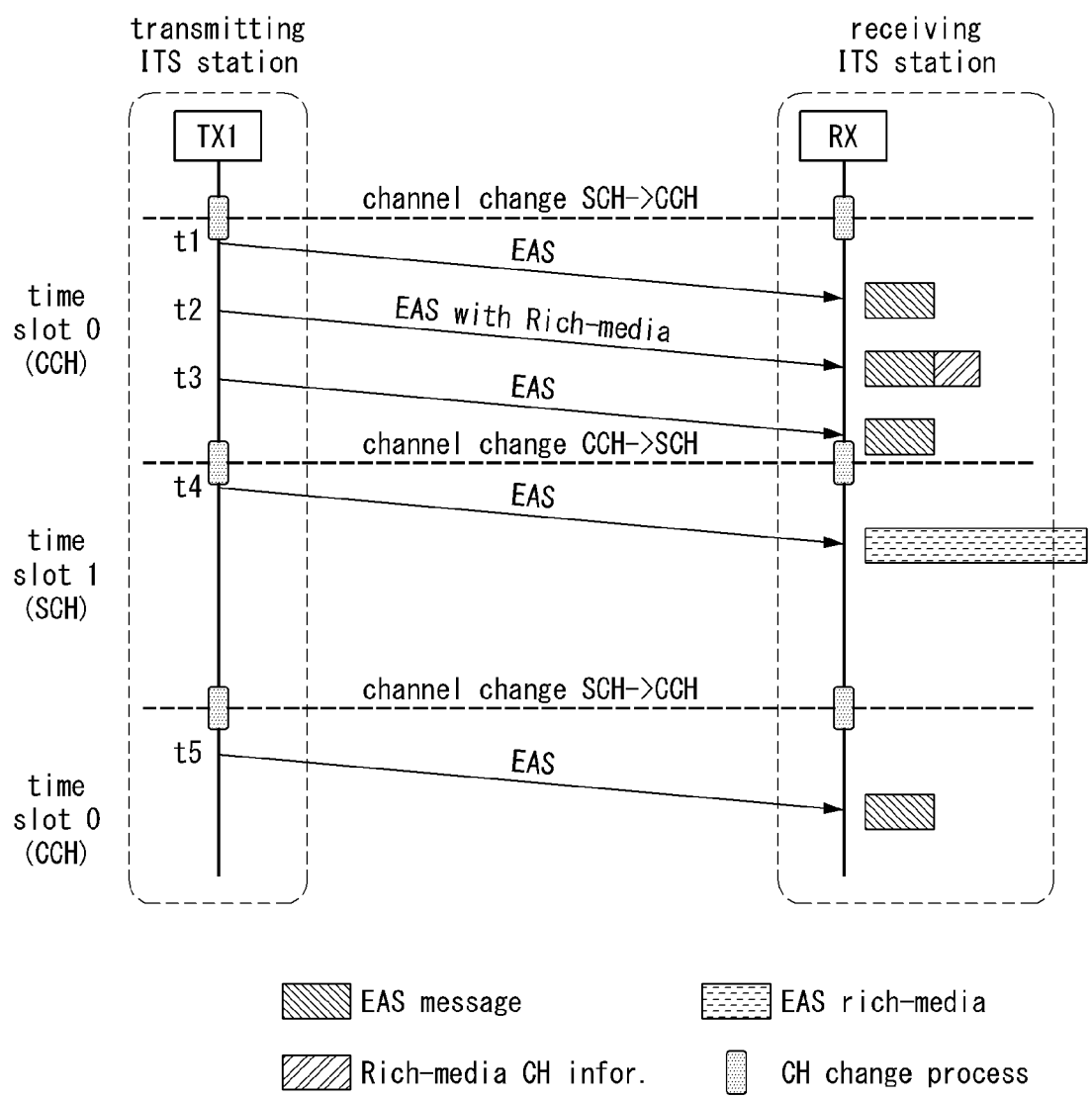
[Figure 24]

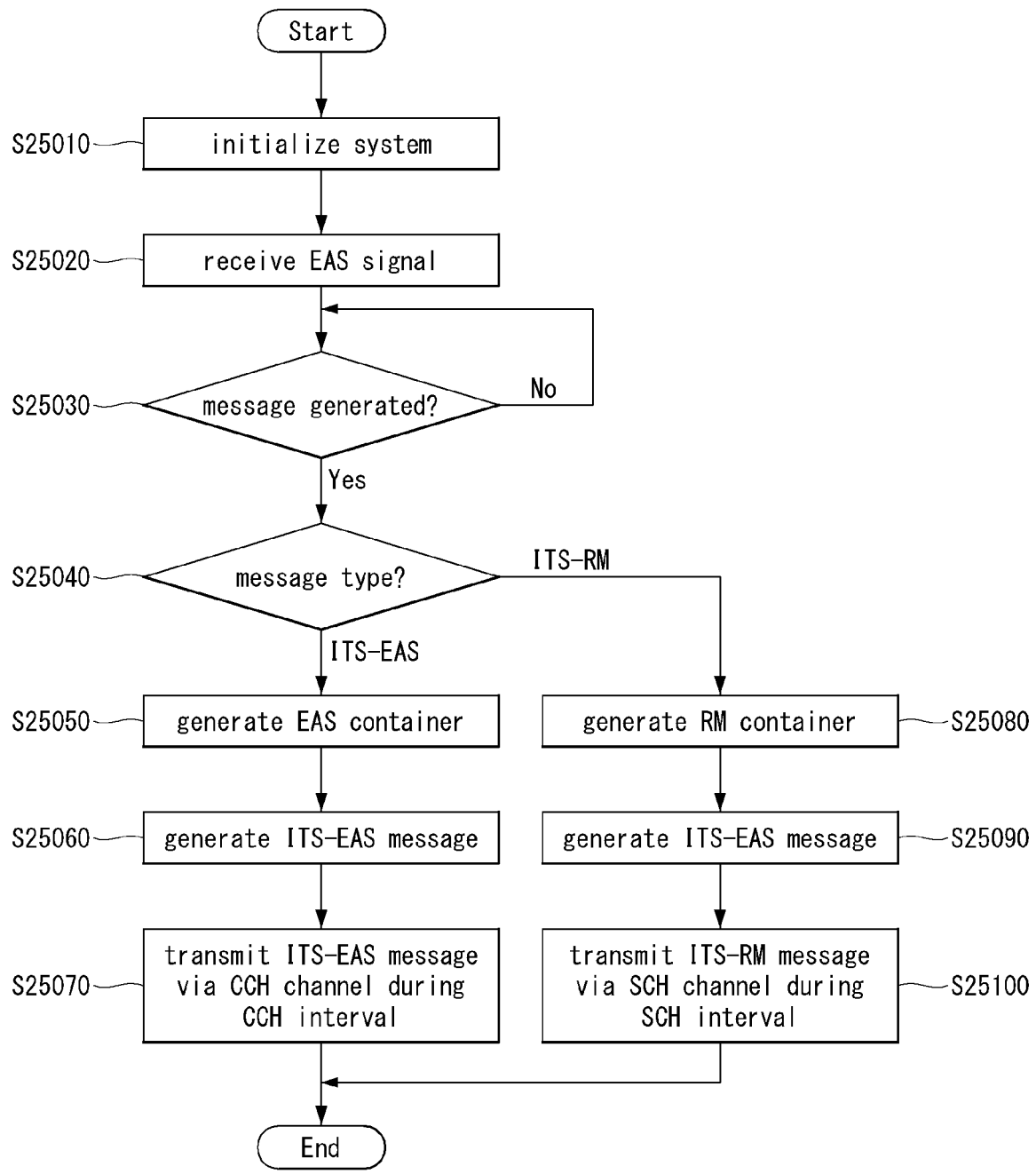
[Figure 25]

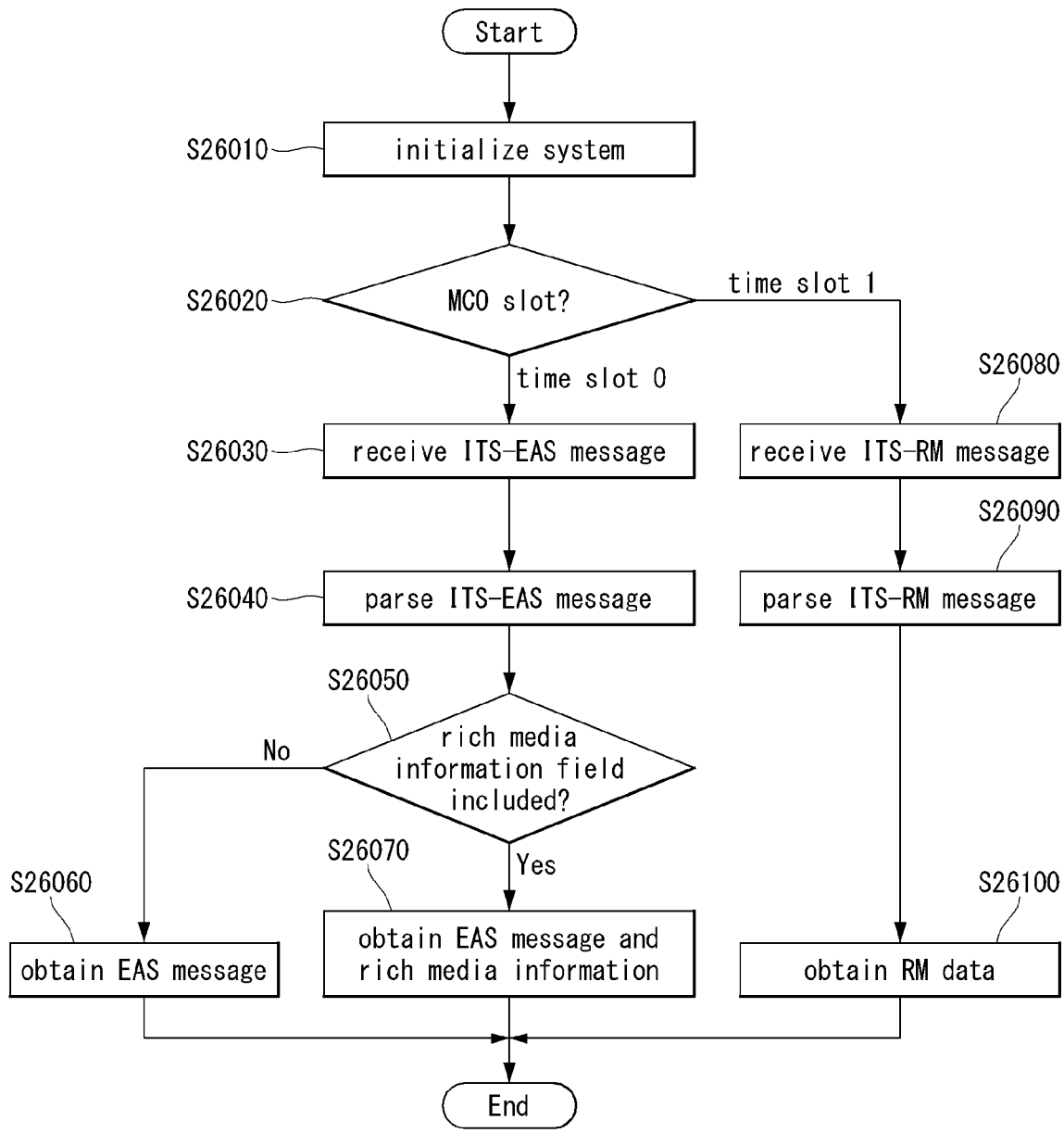
[Figure 26]

[Figure 27]
Transceiver #1
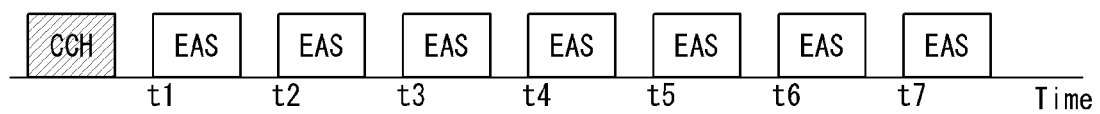
Transceiver #2
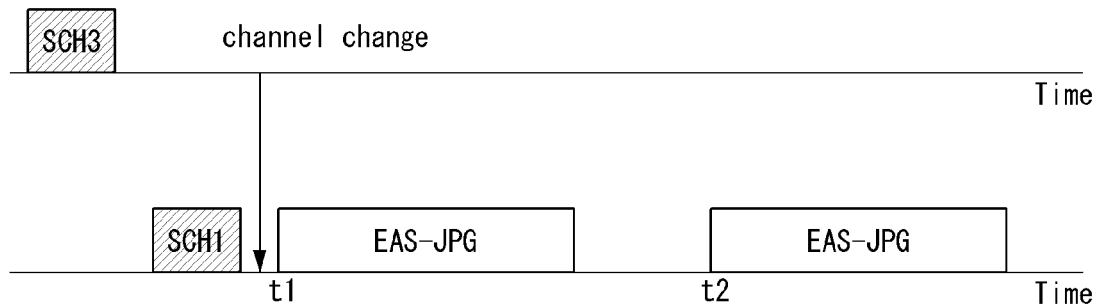

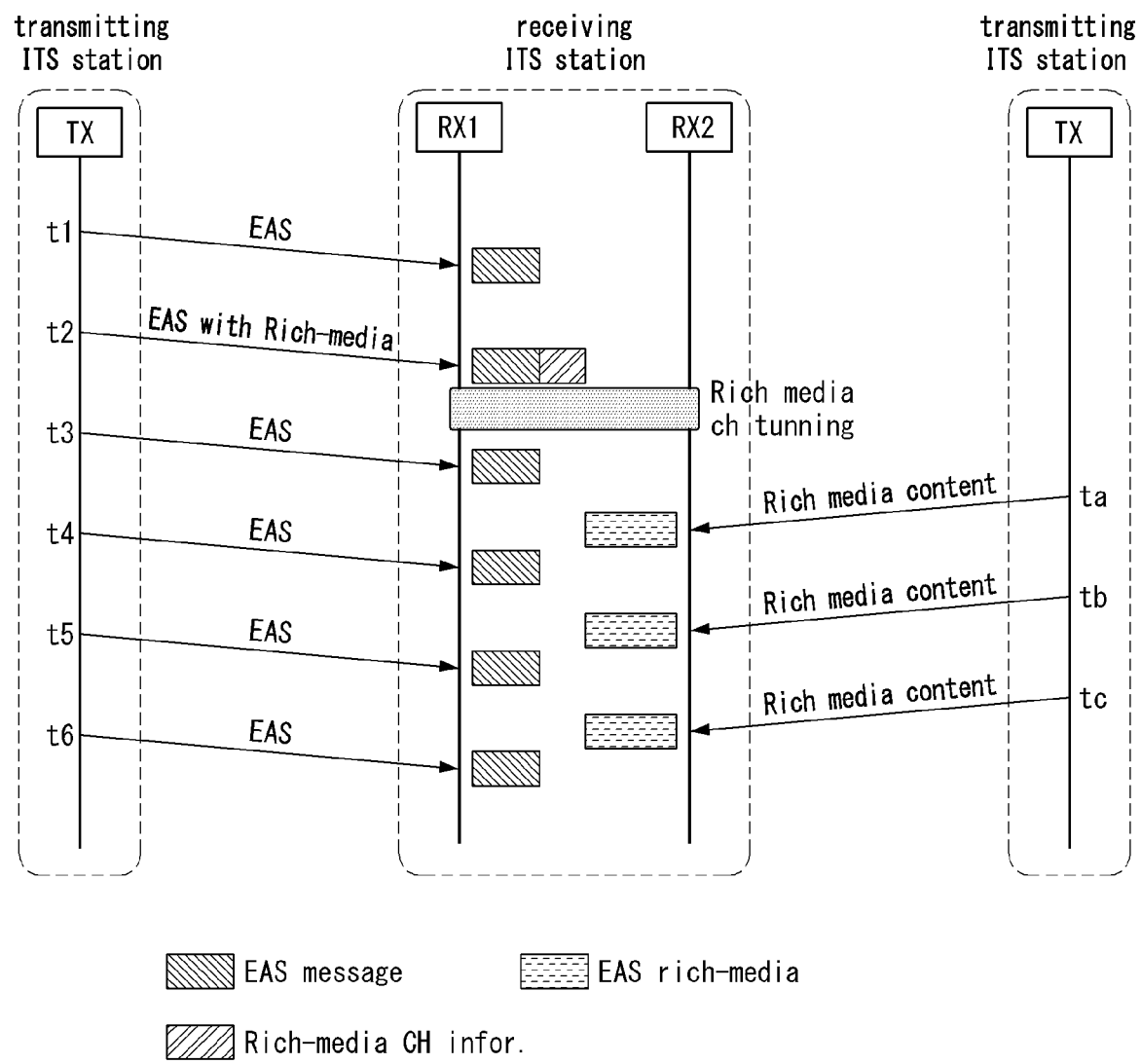
[Figure 28]

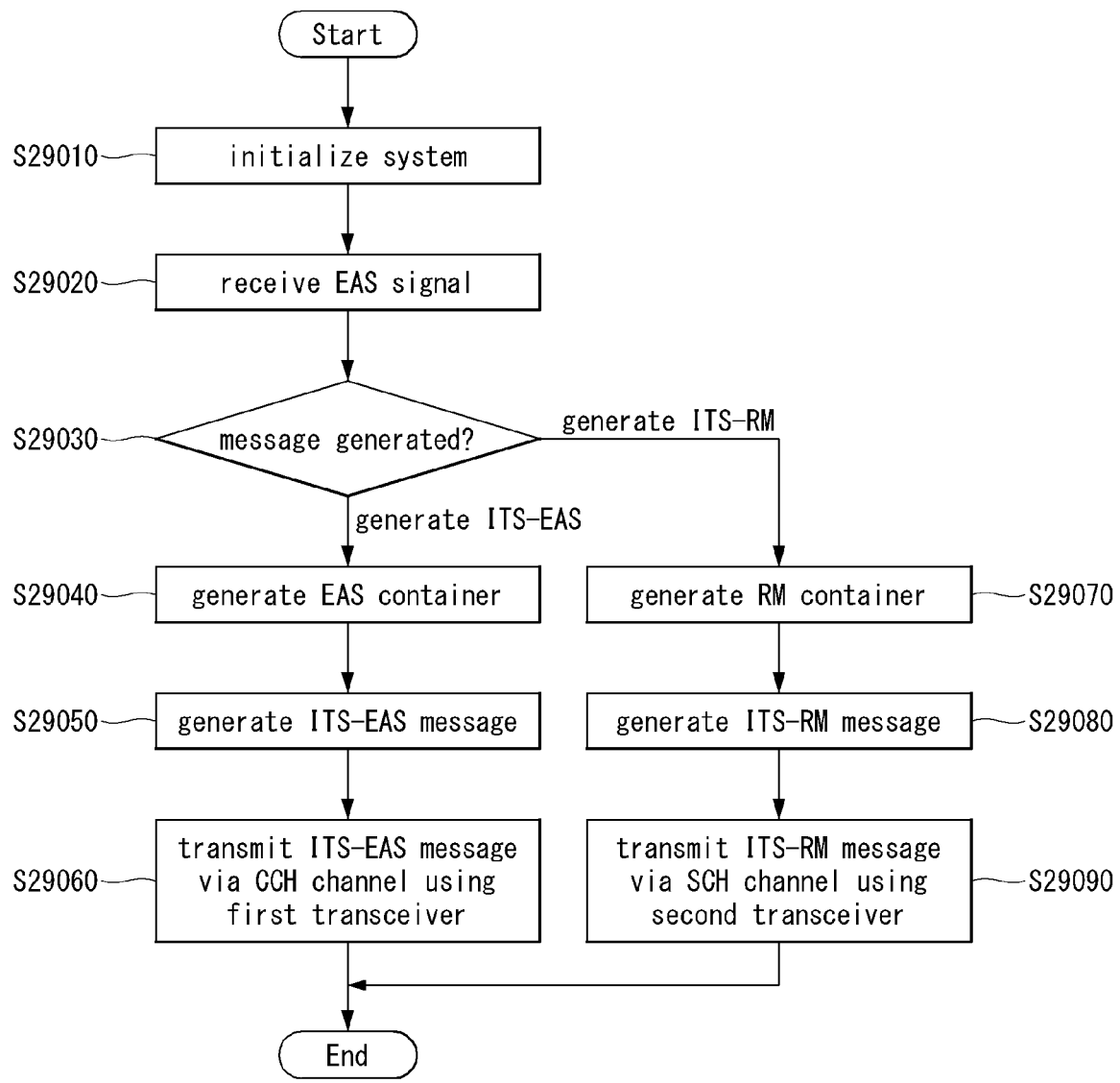
[Figure 29]

[Figure 30]
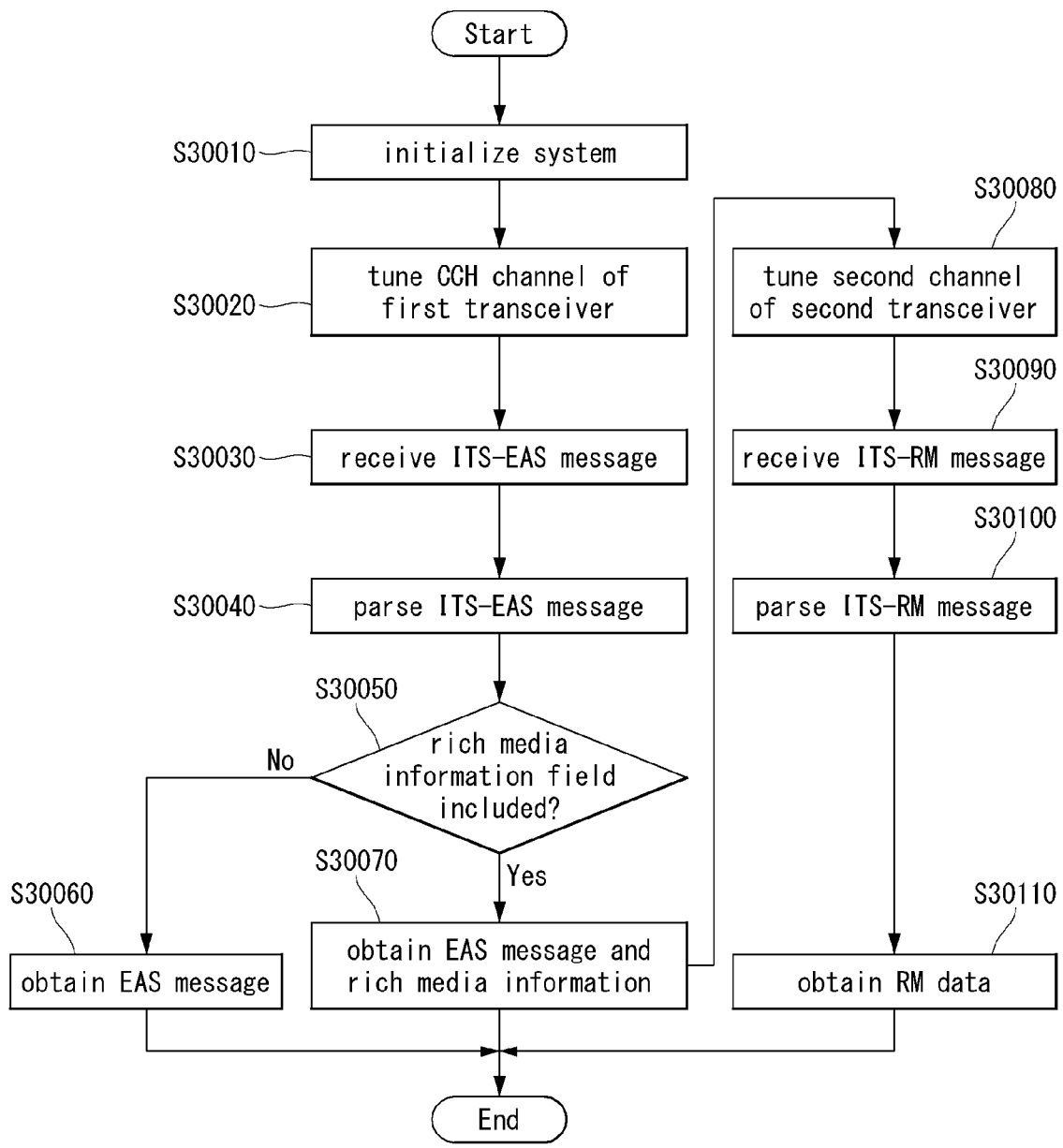

【Figure 31】
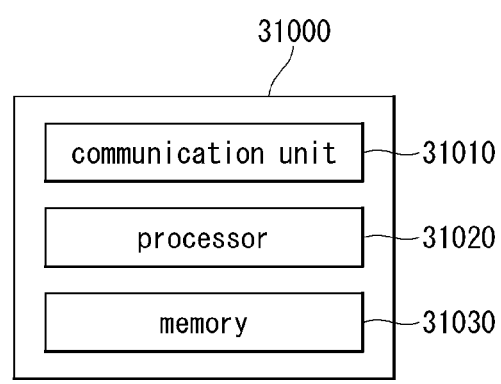

V2X COMMUNICATION DEVICE, AND ITS MESSAGE TRANSMISSION AND RECEPTION METHOD FOR V2X COMMUNICATION DEVICE

This application is the National Stage filing under 35 U.S.C. 371 of International Application No. PCT/KR2017/015761, filed on Dec. 29, 2017, the contents of which is hereby incorporated by reference herein in its entirety.

TECHNICAL FIELD

The disclosure relates to a device for V2X communication and method for transmission/reception of ITS messages thereby, and more particularly, to a method of transmission/reception of ITS messages to provide an EAS service.

BACKGROUND ART

Recently, vehicles are becoming a product of complex industrial technology, in which electrical, electronic and communication technologies are fused, centering on mechanical engineering. In this respect, vehicles are also called smart cars. Smart cars are providing various customized mobile services, as well as traditional vehicle technologies such as traffic safety/congestion settlement by connecting drivers, vehicles, and transportation infrastructures. This connectivity may be implemented using a Vehicle to Everything (V2X) communication technology.

DETAILED DESCRIPTION OF THE DISCLOSURE

Technical Problem

Various services may be provided via V2X communication. A plurality of frequency bands are used to provide various services. Even in such an environment, high-reliable transfer and delivery of a safety service is a significant issue in light of the nature of vehicular communication.

Technical Solution

To address the foregoing issues, according to the disclosure, there is proposed a method for receiving ITS messages by a V2X communication device.

According to an embodiment of the disclosure, a method of receiving an ITS message by a V2X communication device comprises accessing a control channel (CCH), receiving a first ITS message including EAS information via the control channel, and obtaining the EAS information from the first ITS message, wherein the first ITS message may include a rich media information field including information about rich media associated with the EAS information, and wherein the rich media information field may include transmission type information indicating a transmission type of data of the rich media and channel information indicating an ITS channel via which the data of the rich media is transmitted.

According to an embodiment of the disclosure, a V2X communication device receiving an ITS message comprises at least one communication unit transmitting/receiving a communication signal and a processor controlling the communication unit, wherein the processor accesses a control channel (CCH), receives a first ITS message including EAS information via the control channel, and obtains the EAS information from the first ITS message, wherein the first ITS message may include a rich media information field including information about rich media associated with the EAS information, and wherein the rich media information field may include transmission type information indicating a transmission type of data of the rich media and channel information indicating an ITS channel via which the data of the rich media is transmitted.

According to an embodiment, when the transmission type is a first transmission type indicating that the data of the rich media is transmitted in the first ITS message, the processor may obtain the data of the rich media from the first ITS message.

According to an embodiment, when the transmission type is a second transmission type indicating that the data of the rich media is transmitted in a second ITS message, and the second ITS message is processed via the same communication protocol as the first ITS message, the processor may access a service channel (SCH) for receiving the second ITS message based on the channel information, receive the second ITS message including the data of the rich media via the service channel, and may obtain the data of the rich media from the second ITS message.

According to an embodiment, communication via the control channel may be performed during a CCH interval which is a time slot for communication of control information by a first communication unit of the V2X communication device, and communication via the service channel may be performed during an SCH interval which is a time slot for communication of service information by the first communication unit.

According to an embodiment, communication via the control channel may be performed by a first communication unit of the V2X communication device, and communication via the service channel may be performed by a second communication unit of the V2X communication device.

According to an embodiment, the rich media information field may further include content type information indicating a type of content transmitted via the rich media and access type information indicating a type of access technology for transmission or reception of the data of the rich media.

According to an embodiment, the first ITS message may further include an EAS field providing summary information used to quickly receive the EAS information, and wherein the EAS field includes message type information indicating a type of the EAS information, event type information indicating a type of an event associated with the EAS information, emergency information indicating an emergency of the event, or risk information indicating a risk of the event.

Advantageous Effects

According to the disclosure, rich media data may be efficiently transmitted by transferring EAS message-related rich media in various transmission schemes/protocols. Rich media data may be obtained quickly and efficiently by including information about EAS message-associated rich media in ITS messages for transmission of EAS messages. Information about EAS messages may be rapidly received by including summary information about the EAS messages in ITS messages for transmission of the EAS messages. Other various effects of the disclosure are described along with the configurations of the disclosure.

BRIEF DESCRIPTION OF DRAWINGS

The accompanying drawings provided for a better understanding of the disclosure as part of the instant application constitute embodiments of the disclosure along with the detailed description of the disclosure.

FIG. 1 illustrates a reference architecture of an intelligent transport system (ITS) according to an embodiment of the disclosure.

FIG. 2 illustrates an ITS access layer according to an embodiment of the disclosure.

FIG. 3 illustrates a conceptual internal architecture of an MAC sublayer performing multi-channel operation (MCO) according to an embodiment of the disclosure.

FIG. 4 illustrates the relationship between user priority of EDCA and access category (AC) according to an embodiment of the disclosure.

FIG. 5 illustrates a configuration of a physical layer of a V2X transmission device according to an embodiment of the disclosure.

FIG. 6 illustrates a multi-channel allocation used to operate an ITS system according to an embodiment of the disclosure.

FIG. 7 illustrates a channel coordination mode of multi-channel operation according to an embodiment of the disclosure.

FIG. 8 illustrates an EAS system according to an embodiment of the disclosure.

FIG. 9 illustrates an ITS system interworking with an EAS alert system according to an embodiment of the disclosure.

FIG. 10 illustrates a protocol stack of an ITS system interworking with an EAS alert system according to an embodiment of the disclosure.

FIG. 11 illustrates a transmission type of rich media data according to an embodiment of the disclosure.

FIG. 12 illustrates an example architecture of an ITS station for providing an EAS service according to an embodiment of the disclosure.

FIG. 13 illustrate a structure of an EAS-related ITS message and rich media-related ITS message according to an embodiment of the disclosure.

FIG. 14 illustrates an EAS container according to an embodiment of the disclosure.

FIG. 15 illustrates an EAS header according to an embodiment of the disclosure.

FIG. 16 illustrates a rich media (RM) information field according to an embodiment of the disclosure.

FIG. 17 illustrates a rich media (RM) container according to an embodiment of the disclosure.

FIG. 18 illustrates an RM header according to an embodiment of the disclosure.

FIG. 19 illustrates a method of transmitting an EAS message and rich media data via a single channel according to an embodiment of the disclosure.

FIG. 20 illustrates a method of transmitting and receiving EAS data and rich media data via a single channel by a transmission ITS station and a reception ITS station according to an embodiment of the disclosure.

FIG. 21 is a flowchart illustrating a method of transmitting EAS data and rich media data via a single channel by a transmission ITS station according to an embodiment of the disclosure.

FIG. 22 is a flowchart illustrating a method of receiving EAS data and rich media data via a single channel by a reception ITS station according to an embodiment of the disclosure.

FIG. 23 illustrates a method of transmitting an EAS message and rich media data using a single transceiver on multiple channels according to an embodiment of the disclosure.

FIG. 24 illustrates a method of transmitting and receiving EAS data and rich media data using a single transceiver on multiple channels by a transmission ITS station and a reception ITS station according to an embodiment of the disclosure.

FIG. 25 is a flowchart illustrating a method of transmitting EAS data and rich media data using a single transceiver on multiple channels by a transmission ITS station according to an embodiment of the disclosure.

FIG. 26 is a flowchart illustrating a method of receiving EAS data and rich media data using a single transceiver on multiple channels by a reception ITS station according to an embodiment of the disclosure.

FIG. 27 illustrates a method of transmitting an EAS message and rich media data using multiple transceivers on multiple channels according to an embodiment of the disclosure.

FIG. 28 illustrates a method of transmitting and receiving EAS data and rich media data using multiple transceivers on multiple channels by a transmission ITS station and a reception ITS station according to an embodiment of the disclosure.

FIG. 29 is a flowchart illustrating a method of transmitting EAS data and rich media data using multiple transceivers on multiple channels by a transmission ITS station according to an embodiment of the disclosure.

FIG. 30 is a flowchart illustrating a method of receiving EAS data and rich media data using multiple transceivers on multiple channels by a reception ITS station according to an embodiment of the disclosure.

FIG. 31 illustrates a configuration of a V2X communication device according to an embodiment of the disclosure.

MODE FOR CARRYING OUT THE DISCLOSURE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device may be included in an intelligent transport system (ITS) and may perform all or some functions of the ITS system. The V2X communication device may enable communication between vehicles, between a vehicle and infrastructure, between a vehicle and bicycle, or communication with a mobile device. The V2X communication device may be abbreviated as a V2X device. According to an embodiment, the V2X device may correspond to an on-board unit (OBU) of a vehicle or may be included in an OBU. The V2X device may correspond to a road-side unit (RSU) of an infrastructure or may be included in an RSU. Or, the V2X communication device may correspond to an ITS station or may be included in an ITS station. According to an embodiment, the V2X device may operate in an IEEE 1609.1 to 4 wireless access in vehicular environments (WAVE) system.

FIG. 1 illustrates a reference architecture of an intelligent transport system (ITS) according to an embodiment of the disclosure.

In the architecture of FIG. 1, two end vehicles/users may perform communication network communication and such communication may be performed via the function of each layer of the architecture of FIG. 1. For example, when messages are communicated between vehicles, in the transmit vehicle and its ITS system, data may be transferred down through each layer and, in the reception vehicle and its ITS system, data may be transferred up through each layer. Each layer is described below with reference to FIG. 1.

Application layer: The application layer may implement and support various use cases. For example, an application may provide road safety, efficient traffic information, and other application information.

Facilities layer: The facilities layer may support effective implementation of various usage examples defined in the application layer. For example, the facilities layer may perform application support, information support, and session/communication support.

Networking & transport layer: The networking/transport layer may configure a network for vehicular communication between homogeneous/heterogeneous networks by using various transport protocols and network protocols. This is described with reference to FIG. 2.

Access layer: The access layer may transmit messages/data received from the higher layer via a physical channel. For example, the access layer may perform/support data communication based on, e.g., IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology.

According to an embodiment, the access layer may include a data link layer, a physical layer, and layer management. The access layer of FIG. 2 may have the same or similar features to those of the OSI 1 layer (physical layer) and OSI 2 layer (data link layer).

The data link layer may include a logical link control (LLC) sub-layer, a medium access control (MAC) sub-layer, and a multi-channel operation (MCO) sub-layer. The physical layer may include a physical layer convergence protocol (PLCP) sub-layer and a physical medium access (PMD) sub-layer.

The data link layer may convert the physical line between adjacent nodes (or vehicles), where noise is caused, into a communication channel with no transmission errors for use by the higher network layer. The data link layer performs the function of transmitting/conveying/transferring the 3-layer protocol, the framing function that splits data to be transmitted into packets (or frames), which are units of transmission, and groups them, the flow control function that compensates for the speed gap between the transmitting side and the receiving side, and the function of detecting and modifying transmission errors or retransmitting. Further, the data link layer performs the function of assigning sequence numbers to packets and ACK signals to avoid confusion between packets and ACK signals and the function of controlling, e.g., establishing, maintaining, and shorting the data link between network entities and data transmission. The data link layer may include a logical link control (LLC) sub-layer and a medium access control (MAC) sub-layer based on the IEEE 802 standards.

The main feature of the LLC sub-layer is to enable communication regardless of network topology by allowing for several different lower MAC sub-layer protocols.

The MAC sub-layer may control inter-vehicle collisions/contention due to use of shared media by several vehicles (or nodes or vehicles and their surrounding devices). The MAC sub-layer may format the packets transferred from the higher layer into the frame format of the physical network. The MAC sub-layer may perform adding and identifying sender addresses/recipient addresses, detection of the carrier, detection of collisions, and detection of defects on the physical media.

Physical layer: The physical layer is the lowest layer of the ITS layer structure, and may define the interface between the node and transmission medium and perform modulation for transmission of bits between the data link layer entities, coding, and mapping of the transmission channel to the physical channel. Further, the physical layer performs the function of notifying the MAC sub-layer of whether the wireless medium is in use (busy or idle) via carrier sensing or clear channel assessment (CCA). Further, the physical layer may include a physical layer convergence protocol (PLCP) sub-layer and a physical medium access (PMD) sub-layer based on the IEEE standards.

The PLCP layer plays a role to connect the MAC sub-layer with the data frame. The PLCP sub-layer adds a header to the received data, thereby allowing the MAC sub-layer to operate regardless of physical features. Thus, the format of the PLCP frame may be defined to differ depending on several different wireless LAN physical layer standards.

As its main feature, the PMD sub-layer may carrier-modulate (or RF-modulate) the frame received from the PLCP sub-layer and then transmit the same to the wireless medium according to the transmission/reception-related standard.

The layer management serves to manage and serve information related to the operation and security of the access layer. The information and service are bi-laterally transfer and shared via the interface between the MI (interface between management entity and access layer or MI-SAP) and SI (interface between security entity and access layer or SI-SAP). The bi-lateral information and service transfer between the access layer and the networking/transport layer is performed by the IN (or IN-SAP).

The MCO sub-layer may provide various services, such as safety services and other services, e.g., non-safety services, than the safety services, via a plurality of frequency channels. The MCO sub-layer may effectively distribute the traffic load on a specific frequency channel to other channels, thereby minimizing collisions/contention upon inter-vehicle communication on each frequency channel. The MCO sub-layer may perform multi-channel access and operation described below, based on the settings received by the higher layer.

The ITS architecture may further include a management layer and a security layer.

FIG. 2 illustrates a networking and transport layer according to an embodiment of the disclosure.

As described above, the networking/transport layer may configure a network for vehicular communication between homogeneous/heterogeneous networks by using various transport protocols and network protocols.

Referring to FIG. 2(a), the networking/transport layer may provide an IP protocol-based networking function. For example, the networking/transport layer may provide routing with the internet access using the internet protocol, such as TCP/UDP and IPv6.

Or, the networking/transport layer may provide a WSMP protocol-based networking function. For example, the networking/transport layer may configure a vehicle network using the WSMP-T and WSMP-N protocol.

Referring to FIG. 2(b), like in FIG. 2(a), the networking/transport layer may provide an IP protocol-based networking function. For example, the networking/transport layer may provide routing with the internet access using the internet protocol, such as TCP/UDP and IPv6.

Or, the networking/transport layer may configure a vehicle network using a geographical position-based protocol, such as basic transport protocol (BTP)/geonetworking.

FIG. 3 illustrates a conceptual internal architecture of an MAC sublayer performing an MCO according to an embodiment of the disclosure.

According to an embodiment, the MCO architecture of FIG. 3 may include channel coordination where channel access is defined, channel routing defining the operation process of the management frame and the overall data between the PHY-MAC layers, enhanced dedicated channel access (EDCA) determining and defining the priority of transmission frames, and a data buffer (or queue) storing frames received by the higher layer. The channel coordination block is not shown in FIG. 3. Channel coordination may be carried out by the whole MAC sub-layer of FIG. 3.

Channel coordination: As an embodiment, channel access to the control channel (CCH) and service channel (SCH) may be controlled. Channel access coordination is described below. According to an embodiment, wave short messages (WSMs) may be transmitted via the CCH, and WSMs and/or IP data may be transmitted via the SCH.

Data buffer (queue): The data buffer may store the data frames received from the higher layer according to access categories (AC). In the embodiment of FIG. 3, a data buffer may be provided per AC.

Channel routing: The channel routing block may transfer the data input from the higher layer to the data buffer. For a request for transmission by the higher layer, transmission operation parameters, such as channel number, transmission power, and data rate, for frame transmission and the above-described channel coordination may be invoked.

EDCA: In a scheme for ensuring the QoS in the legacy IEEE 802.11e MAC layer, four access categories (ACs) may be provided depending on the kind of traffic, a differentiated priority may be given to each category, and differentiated parameters are allocated to each AC, so that more transmission chances are provided to higher-priority traffic—i.e., contention-based medium access. For transmission of data including priority, the EDCA block designates eight priorities from 0 to 7 and, depending on the priorities, data reaching the MAC layer may be mapped to the four ACs.

FIG. 4 illustrates the relationship between user priority of EDCA and access category (AC) according to an embodiment of the disclosure.

The relationship between the user priority of the EDCA and the AC is shown in FIG. 4. In the figure, as the number of the AC increases, the higher priority is given. All the ACs have their respective transmission queues and AC parameters, and the difference in priority between the ACs is determined based on AC parameter values set to differ. The different AC parameter values are connected with the backoff and have different channel access rankings. The parameter values of the ACs each use AIFS[AC], CWmin[AC], and CWmax[AC]. Here, AIFS (Arbitration Inter-Frame Space) refers to the minimum time for identifying whether the channel is idle before performing transmission. The smaller AIFS [AC] and CWmin[AC] are, the higher priority is given. Thus, the channel access delay is shortened so that more bands may be used in the given traffic environment.

When a collision occurs between the stations amid frame transmission, the transmitter generates a new backoff counter. The respective transmission queues of the four ACs defined in IEEE 802.11 MAC individually contend against each other to access the wireless medium in one station as shown in FIG. 4. Since each AC has an independent backoff counter, a virtual collision may occur. If two or more ACs have simultaneously finished backoff, data from the AC with the highest priority may first be transmitted, and the other ACs may increase the CW value to update again the backoff counter. The process of addressing collision is referred to as virtual collision processing. Further, the EDCA allows for a channel upon transmission of data via transmission opportunity (TXOP). If one frame is too long to transmit within one TXOP, it may be split into smaller frames that are then transmitted.

FIG. 5 illustrates a configuration of a physical layer of a V2X transmission device according to an embodiment of the disclosure.

According to an embodiment, FIG. 5 is a block diagram illustrating the physical layer signal processing of IEEE 802.11 or ITS-G5. However, FIG. 5 illustrates a configuration of physical layer according to an embodiment of the disclosure and its application is not limited to the above-described transmission standard technology.

The physical layer processor of FIG. 5 may include a physical layer convergence protocol (PLCP) sub-layer base band signal processing part and wave shaping 5090 including at least one of a scrambler 5010, an FED encoder 5020, an interleaver 5030, a mapper 5040, a pilot insertion block 5050, an IFFT block 5060, a guard insertion block 5070, and a preamble insertion block 5080 and a physical medium dependent (PMD) sub-layer RF band signal processing part including at least one of an I/Q modulation block 5100 and a DAC 5110. The functions of each block are described below.

The scrambler 5010 may XOR the input bit stream with a pseudo random binary sequence (PRBS), thereby randomizing it. The FEC encoder 5020 may add a redundancy to the transmission data to allow the receive part to correct errors on the transmission channel. The interleaver 5030 may interleave the input data/bit stream based on an interleaving rule so as to respond to burst errors. According to an embodiment, if deep fading or erasure is applied to QAM symbols, since each QAM symbol has been mapped with interleaved bits, an error may be prevented from occurring in the consecutive bits among all the codeword bits. The mapper 5040 may allocate the input bit word to one constellation. The pilot insertion block 5005 inserts a reference signal in a predetermined position of the signal block. Use of the reference signal allows the receiver to estimate the channel and channel distortion, such as frequency offset and timing offset.

The IFFT block 5060, i.e., the inverse waveform transform block, may transform the input signal to have enhanced transmission efficiency and flexibility, considering the system structure and the properties of the transmission channel. According to an embodiment, for OFDM systems, the IFFT block 5060 may transform frequency-domain signals into time-domain signals using an inverse FFT operation. For single carrier systems, the IFFT block 5060 may be not used or omitted. The guard insertion block 5070 may insert a guard interval between adjacent signal blocks to minimize influence by the delay spread of the transmission channel. According to an embodiment, for OFDM systems, the guard insertion block 5070 may insert a cyclic prefix into a guard interval period. The preamble insertion block 5080 may insert a predetermined type of signal, i.e., the preamble, between the transmitter and receiver to the transmission signal for the receiver to quickly and efficiently detect the target signal. According to an embodiment, for OFDM systems, the preamble insertion block 5080 may define a signal block/signal frame including a plurality of OFDM symbols and insert a preamble symbol to the start of the signal block/signal frame.

The wave shaping block 5090 may waveform-process the input baseband signal based on the properties of channel transmission. According to an embodiment, the waveform shaping block 5090 may perform square-root-raised cosine (SRRC) filtering to obtain the out-of-band emission of the transmission signal. For multi-carrier systems, the waveform shaping block 5090 may be not used or be omitted. The I/Q modulator 5100 may perform in-phase and quadrature modulation. The digital-to-analog converter (DAC) 5110 block may convert the input digital signal into an analog signal and output the analog signal. The output analog signal may be transmitted via the output antenna.

Each of the blocks shown and described in connection with FIG. 5 may be omitted or replaced with other block with the same or similar features.

FIG. 6 illustrates a multi-channel allocation used to operate an ITS system according to an embodiment of the disclosure.

FIG. 6(*a*) illustrates a US spectrum allocation for ITS, and FIG. 24(*b*) illustrate EP spectrum allocation for ITS.

In FIG. 6, the US and Europe have seven frequencies (each frequency band being 10 MHz) in the 5.9 GHz band (from 5.855 GHz to 5.925 GHz). The seven frequencies may include one control channel (CCH) and six service channels (SCHs). As shown in FIG. 25(*a*), in the case of the U.S., the CCH may be allocated to channel number 178 and, as shown in FIG. 25(*b*), in the case of Europe, the CCH may be assigned to channel number 180.

Europe considers use of ITS-G63 band in addition to the higher frequency band over 5.9 GHz and the ITS-G5 band, as a lower frequency band, so as to provide a time-sensitive, higher-data volume of service. In such an environment, efficient multi-channel operation schemes need to be developed to provide high-quality service by properly allocating service to various multiple channels.

The control channel (CCH) refers to a radio channel used to exchange management frames and/or WAVE messages. The WAVE message may be a WAVE short message (WSM). The service channel (SCH) is a radio channel used to provide service and refers to any channel that is not the control channel According to an embodiment, the control channel may be used to communicate system management messages, such as WAVE service advertisements (WSAs), or communicate wave short message protocol (WSMP) messages. The SCH may be used for general-purpose application data communication, and such general-purpose application data communication may be coordinated by service-related information such as WSA.

WSA may also be referred to as service advertisement information. WSA may provide information including an announcement of the availability of application-service. The WSA message may identify and describe the application service and the channel accessible by the service. According to an embodiment, WSA may include a header, service information, channel information, and WAVE routing advertisement information.

FIG. 7 illustrates a channel coordination mode of multi-channel operation according to an embodiment of the disclosure.

FIG. 7 illustrates channel coordination of multi-channel operation, (a) continuous mode, (b) altering mode, (c) extended mode, and (d) immediate mode.

The V2X device may access at least one channel. According to an embodiment, a single radio device may exchange data on the SCH channel while monitoring the CCH channel. To that end, channel intervals need to be specified. FIG. 7 illustrates allocation of channel intervals, i.e., time slots. Radio channel altering may be operated based on the intervals synchronized in association with the common time base. The sync intervals may include CCH intervals and SCH intervals. During the CCH interval, traffic may be exchanged on the CCH. The single radio device participating in application-service may switch to the SCH during the SCH interval. The CCH interval and the SCH interval each may include a guard interval. Each interval may start with the guard interval.

According to an embodiment, exchange of multi-channel operation information and safety-related service information may be performed on the CCH during the CCH interval. Further, a negotiation for exchanging information between the service provider and user may be performed on the CCH during the CCH interval. Hardware timing operation for channel altering for V2X device may be initiated by a sync signal obtained by universal time coordinated (UTC) estimation. Channel synchronization may be performed every pulse per second (PPS) interval based on the UTC.

According to an embodiment, FIG. 7 illustrates a channel coordination method for multi-channel operation (MCO) described in IEEE 1609.4, showing a method that in one physical layer, two MAC layers alternately use CCH and different channel modes in a time-division manner.

(a)&(b) Continuous mode: Continuous mode is a mode in which each vehicle or all vehicles are operated regardless of time-division criteria, such as time slots/CCH intervals/SCH intervals. In continuous mode, the V2X device may continuously receive multi-channel o information and safety-related service information on a designated CCH or SCH or exchange information between the service provider and user.

(c) Altering mode: In altering mode, each or all vehicles may receive multi-channel operation information and safety-related service/information during the CCH interval or perform a negotiation for exchanging information between the service provider and user. In altering mode, each or all vehicles exchange service/information between the service provider and user during the SCH interval. In altering mode, the V2X device may alternately perform communication via the CCH and SCH during a configured CCH interval and SCH interval.

(d) Extended mode: In the extended mode, communication during the CCH interval and SCH interval may be performed as in altering mode. However, exchange of service/information during the SCH interval may also be performed during the CCH interval. According to an embodiment, in extended mode, the V2X device may transmit/receive control information during the CCH interval and, upon entering the SCH interval, maintain the SCH interval until exchange of service/information is terminated.

(e) Immediate mode: In immediate mode, communication by the V2X device may be performed as in altering mode and/or extended mode. However, if the negotiation for exchanging information is complete during the CCH interval, the V2X device may immediately switch to a designated SCH, rather than waiting for the end of the CCH interval, and initiate information exchange.

FIG. 8 illustrates an EAS system according to an embodiment of the disclosure.

EAS system is a system that issues an emergency alert (EA) via various transmission channels when such an occasion occurs as tornadoes, earthquakes, heavy snow storms, or other natural disasters or those severely influencing national security.

Referring to FIG. 8, the EAS system may include an EAS alert system and at least one broadcast system connected with the EAS alert system via an EAS network. The EAS alert system may be referred to as an EAS center system or EAS server.

In the embodiment of FIG. 8, the EAS alert system may include an EAS system server and an EAS communication modem for EAS alert system connected with the EAS system server. Each broadcast system may include an EAS communication modem for broadcast system and a broadcast transmitter connected with the EAS communication modem. In this case, the EAS communication modem for broadcast system may be connected with the EAS communication modem for EAS alert system via the EAS network.

The EAS alert system may generate an EAS message including EA-related information and transmit the EAS message via the EAS network. For example, the EAS alert system may transmit an EA message in the format of a common alerting protocol (CAP) message through the EAS network to the broadcast system.

The broadcast system may generate an EAS message for broadcast system based on the EAS message received from the EAS alert system and transmit the message via broadcast media, such as radio, TV, or cable TV. For example, the TV broadcast system may generate an EAS message for TV broadcast system based on the EAS message received from the EAS alert system and transmit the message via TV broadcast media. At this time, each broadcast system may generate and transmit the EAS message for broadcast system based on a predefined EAS protocol. The EAS protocol may be, e.g., the EAS protocol specified in part 11 of the federal communications commission (FCC).

FIG. 9 illustrates an ITS system interworking with an EAS alert system according to an embodiment of the disclosure. In the embodiment of FIG. 9, the EAS message provided by the EAS alert system may be transferred via the ITS system, but not the broadcast system.

As described above in connection with FIG. 9, the EAS alert system may generate an EAS message including EA-related information and transmit the EAS message via the EAS network to other system. For example, as shown in FIG. 9, the EAS alert system may gather disaster information generated by an alerting authority (AA) through the IPAWS aggregator, generate an EAS message in the common alerting protocol (CAP) message format based on the gathered information, and transmit the EAS message to the roadside ITS station (RIS) via the EAS network.

The RIS may generate an EAS message for ITS and transmit the EAS message through the ITS network to the surrounding vehicles' ITS stations (VIS). In this case, the channel used for transmitting the EAS message for ITS may be a safety channel (e.g., for the U.S., 5.850 GHz) allocated for ITS purposes.

Further, the EAS alert system may transmit a rich media file/data (e.g., EA-related image or video) generated via the rich media resource, as additional data of the EAS message, to the RIS. In this case, the RIS may transmit the rich media data along with the EAS message to the ambient VIS.

In the disclosure, EAS message for ITS may be denoted as EAS-related ITS message, EAS ITS message, or ITS-EAS message. Further, EAS message for ITS is so termed to differentiate from the EAS message provided by the EAS alert system, and EAS message for ITS may simply be denoted as EAS message.

FIG. 10 illustrates a protocol stack of an ITS system interworking with an EAS alert system according to an embodiment of the disclosure. In the embodiment of FIG. 16, the ITS system may be the ITS system of FIG. 9.

Referring to FIG. 10, the EAS alert system may have a communication protocol stack (EAS communication protocol stack) for EAS services. For example, the EAS system may include an EAS application layer, an EAS facilities layer, an EAS transport layer, an EAS network layer, and an EAS access layer. The EAS alert system may generate an EA message via the communication protocol and transmit the EA message through the EAS network to the transmission ITS station (e.g., the RIS). Further, the EAS alert system may transmit rich media data associated with the EAS message, along with the EAS message, through the EAS network.

The transmission ITS station may have an EAS communication protocol stack and a communication protocol stack (ITS communication protocol stack) for ITS service. For example, the transmission ITS station may include an EAS facilities layer, an EAS transport layer, an EAS network layer, and an EAS access layer. Further, the transmission ITS station may include an ITS application layer, an ITS facilities layer, an ITS transport layer, an ITS network layer, and an ITS access layer. The transmission ITS station may receive the EAS message through the EAS communication protocol and process the EAS message and may generate and transmit an ITS-EAS message, which is an EAS message for ITS, through the ITS station. By so doing, the transmission ITS station may transmit the ITS-EAS message through the ITS network to the reception ITS station (e.g., the VIS).

The reception ITS station may have an ITS communication protocol stack. For example, the reception ITS station may include an ITS application layer, an ITS facilities layer, an ITS transport layer, an ITS network layer, and an ITS access layer. The reception ITS station may receive and process the ITS-EAS message via the ITS protocol. By so doing, the reception ITS station may obtain EA-related information and provide the user with the EA-related information via a human interface.

FIG. 11 illustrates a transmission type of rich media data according to an embodiment of the disclosure. In the embodiment of FIG. 11, rich media data may be data of rich media associated with the EAS message.

The EAS message (ITS-EAS) and its associated rich media data may be transmitted via heterogeneous networks (e.g., ITS network). In this case, the rich media data may be transmitted in the three types as follows. In the disclosure, transmission type may be denoted as a protocol type, transmission protocol type, or communication protocol type.

Type 1 (first transmission type): In type 1, rich media data is included in the ITS-EAS message and transmitted along with the ITS-EAS message. As shown in FIG. 11(a), in type 1, the rich media data may be regarded as safety data such as EAS data and be transmitted through the same path as the EAS data.

In type 1, since EAS data and its associated rich media data are both included in one ITS-EAS message, the alert message and its associated rich media may advantageously be directly connected and shown. However, due to an increased size in the ITS-EAS message, the transmission throughput of the safety channel where the ITS-EAS message is transmitted may be overly occupied. Thus, the type-1 transmission scheme may be appropriate only for transmission of such rich media data as small-size image files or emergency audio files.

Type 2 (second transmission type): In type 2, rich media data is processed as an ITS-intended RM message (ITS-RM message) separate from the ITS-EAS message and is transmitted via the same lower layer protocol (e.g., networking/transport layer protocol and/or access layer protocol) as the ITS-EAS message. In the disclosure, RM message for ITS may be denoted as RM-related ITS message, RM ITS message, or ITS-RM message.

As shown in FIG. 11(b), in type 2, although the rich media data is regarded as non-safety data unlike EAS data, the ITS-RM message including the rich media data may be transmitted via processing using the same lower layer protocol as the ITS-EAS message. For example, the ITS-RM message encoded in the ASN.1 format may be processed using the same networking/transport layer protocol as the ITS-EAS message. According to an embodiment, the protocol of the networking/transport layer may be the WSMP-T and WSMP-N protocol.

In type 2, since the ITS-RM message is processed using the same networking/transport protocol as the ITS-EAS message, the same networking/transport operation that is performed on the ITS-EAS message may be performed. However, since the ITS-RM message is a non-safety message, it is transmitted via a different channel from the safety channel where the ITS-EAS message, which is a safety message, is transmitted. For example, the ITS-RM message may be transmitted via the SCH channel, not the CCH channel where the ITS-EAS is transmitted.

Type 3 (third transmission type): In type 3, rich media data is processed as an ITS message (ITS-RM message) separate from the ITS-EAS message and is transmitted via a different lower layer protocol (e.g., networking/transport layer protocol and/or access layer protocol) from the ITS-EAS message.

As shown in FIG. 11(c), in type 2, the rich media data may be regarded as non-safety data, and the ITS-RM message including the rich media data may be transmitted via processing using the same lower layer protocol as the ITS-EAS message. For example, the ITS-RM message may be processed using a different networking/transport layer protocol from the ITS-EAS message. According to an embodiment, the networking/transport layer protocol for ITS-RM messages may be the UDP/TCP and IP protocol, and the networking/transport layer protocol for ITS-EAS messages may be the WSMP-T and WSMP-N protocol.

Type 3 may be operated on an IP diagram basis and be thus used for general purposes but may not operate an ITS-dedicated network.

FIG. 12 illustrates an example architecture of an ITS station for providing an EAS service according to an embodiment of the disclosure. In connection with FIG. 12, those described above with reference to FIG. 1 are not described.

In the embodiment of FIG. 12, an EAS service entity for providing an EAS service may be added to the facilities layer. The EAS service entity may be connected with the application layer through an FA-SAP, with the security layer through an SF-SAP, with the networking/transport layer through an NF-SAP, and the management layer through an MF-SAP.

In the case of transmission ITS station (transmission V2X communication device), the EAS service entity may generate an ITS-EAS message based on EAS data (e.g., the whole or part of data in the EAS message in the CAP format) received from the application layer. At this time, the EAS service entity may receive the EAS data from the application layer through the FA-SAP. Also, the EAS service entity may transfer the generated ITS-EAS message to the lower layer through the NF-SAP.

According to an embodiment, the EAS service entity may generate the ITS-EAS message using a location service entity for managing location information, a common data dictionary (CDD) entity for managing common messages, or a vehicle data provider (VDP) having the vehicle's unique information. The EAS service entity may receive information (channel state information) about the ITS channel state from the MCO entity of the management layer through the MF-SAP and use the information in generating the ITS-EAS message.

Meanwhile, if rich media data is transferred from the application layer, the EAS service entity may process the rich media data depending on the above-described transmission type.

For example, when the transmission type is the first transmission type, the EAS service entity may generate an ITS-EAS message including rich media data and transfer the message through the NF-SAP to the WSMP path. In the case of the first transmission type, the generated ITS-EAS message may be a message encoded in ASN.1.

When the transmission type is the second transmission type, the EAS service entity may generate an ITS-RM message including rich media data and transfer the message through the NF-SAP to the WSMP path. In the case of the second transmission type, the generated ITS-RM message may be a message encoded in ASN.1.

When the transmission type is the third transmission type, the EAS service entity may generate an ITS-RM message including rich media data and transfer the message through the NF-SAP to the IP path. Unlike in the second transmission type, in the third transmission type, the generated ITS-RM message may be a message that has not been encoded in ASN.1.

The reception ITS station (reception V2X communication device) may perform the operations of the transmission ITS station in a reverse order thereof. The EAS service entity may receive the ITS-RM message including the rich media data through the NF-SAP.

For example, when the transmission type is the first transmission type, the EAS service entity may receive the ITS-EAS message including the rich media data through the WSMP path. At this time, the ITS-EAS message may be a message encoded in ASN.1. In this case, the EAS service entity may decode the ITS-EAS message in ASN.1 to obtain the rich media data and may transfer the rich media data to the application layer through the FA-SAP.

Or, when the transmission type is the second transmission type, the EAS service entity may receive the ITS-RM message including the rich media data through the WSMP path. At this time, the ITS-RM message may be a message encoded in ASN.1. In this case, the EAS service entity may decode the ITS-RM message in ASN.1 to obtain the rich media data and may transfer the rich media data to the application layer through the FA-SAP.

Or, when the transmission type is the third transmission type, the EAS service entity may receive the ITS-RM message including the rich media data through the IP path. At this time, the ITS-RM message may be a message that has not been encoded in ASN.1. In this case, the EAS service entity may transfer the ITS-RM message, without ASN.1 decoding, to the application layer through the FA-SAP.

The structure of an ITS message for efficiently transmitting rich media is described below.

FIG. 13 illustrate a structure of an EAS-related ITS message and rich media-related ITS message according to an embodiment of the disclosure. FIG. 13(a) illustrates an example structure of an EAS-related ITS message and rich media-related ITS message for the U.S., and FIG. 13(b) illustrates an example EAS-related ITS message and rich media-related ITS message for Europe. As described above, the EAS-related ITS message may be denoted as an ITS-EAS message, and the rich media-related ITS message may be denoted as an ITS-RM message.

Referring to FIG. 13(a), the ITS-EAS message (first ITS-EAS message) for the U.S. may include a common container and an EAS container. The ITS-RM message (first ITS-RM message) may include a common container and an RM container.

Referring to FIG. 13(b), the ITS-EAS message (second ITS-EAS message) for Europe may include an ITS PDU header and an EAS container. The ITS-RM message (second ITS-RM message) may include an ITS PDU header and an RM container.

FIG. 14 illustrates an EAS container according to an embodiment of the disclosure. FIG. 14(a) illustrates the structure of the EAS container, and FIG. 14(b) illustrates the ASN.1 representation of the EAS container. In the embodiment of FIG. 14, the EAS container may be an EAS container included in the ITS-EAS message of FIG. 13(a) or (b).

Referring to FIG. 14, the EAS container may include an EAS header, an EAS message and/or rich media data. Each part/field is described below.

EAS header: A field for indicating the configuration of the EAS message/data.

EAS message: A field where the EAS data is transmitted. According to an embodiment, the EAS message field may include the whole or part of data in the EAS message received from the EAS alert system. In the disclosure, EAS message field may be denoted as an EAS data field.

Rich media data (RM data): An optional field added in the case of the first transmission type described above in connection with FIG. 11. According to an embodiment, the RM data field may include the whole or part of rich media data received from the EAS alert system. According to an embodiment, the RM data field may be defined as an octet string and may include rich media data in the form of a binary file.

FIG. 15 illustrates an EAS header according to an embodiment of the disclosure. FIG. 15(a) illustrates the structure of the EAS header, and FIG. 15(b) illustrates the ASN.1 representation of the EAS header. In the embodiment of FIG. 15, the EAS header may be the EAS header included in the EAS container of FIG. 14.

Referring to FIG. 15, the EAS header may include the message ID, fast EAS and/or rich media data (Rich-Media infor). Each part/field is described below.

Message ID: A field for indicating the ID for identifying the EAS message. To match the EAS message with its related rich media, the message ID in the EAS header of the ITS-EAS message and the message ID in the RM header of the ITS-RM message may have the same value. With this, the ITS-EAS message including the EAS message and the ITS-RM message including the rich media data associated with the EAS message may be matched to each other.

Fast EAS: A field for quickly receiving the EAS message. For example, this field may be used to quickly receive summary information about the EAS message. With this, the reception ITS station may rapidly obtain summary information about the EAS message by parsing the EAS header without parsing the EAS message field.

According to an embodiment, the fast EAS field may include types of information as shown in Table 1 below. Table 1 shows an example ASN.1 representation of the fast EAS

FIELD

TABLE 1

| ASN.1 Representation | |
| --- | --- |
| DF_FastEAS | ::= SEQUENCE { |
| MessageType | DE_MessageType |
| EventType | DE_EventType |
| UrgencyType | DE_UrgencyType |
| SeverityType | DE_SeverityType |
| CertaintyType | DE_CertaintyType |
| } | |

Referring to Table 1, the fast EAS field, as a data frame (DF_FastEAS), may include, e.g., message type information indicating the type of the EAS message, event type information indicating the type of an event (e.g., an event related to the EAS message), emergency type information (emergency information) indicating the emergency (e.g., the emergency related to providing the EAS message) of the EAS message, severity type information (severity information) indicating the severity (e.g., the degree of risk of the event related to the EAS message) of the EAS message, and/or certainty type information indicating the certainty of the EAS message. The emergency type information, severity type information, and certainty type information may indicate the properties of the event of the EAS message.

According to an embodiment, the message type indicated by the message type information may include at least one of an alert message type indicating the alert, an update message type indicating whether the alert is updated, a cancel message type indicating that the alert has been canceled, an ACK message type indicating an ACK, or an error message type indicating that the message identified as reference has been declined.

According to an embodiment, the event type information may include an event code indicating the type of event. The event type indicated by the event code may include, e.g., blizzard warning, fire warning or flood warning.

According to an embodiment, the emergency (emergency type) indicated by the emergency type information may include at least one of an immediate type indicating that the event is one that should be responded to immediately, an expected type indicating that the event is one that should be responded to within one hour, a future type indicating that the event is one that should be responded to in the future, a past type indicating that the event need not be responded to any longer, or an unknown type indicating that the event is one whose emergency level is not known.

According to an embodiment, the severity type indicated by the severity type information may include at least one of an extreme type indicating that the event is one that has a very severe influence (e.g., the severity level at which life and assets may be put at risk), a severe type indicating that the event has a significant influence, a moderate type indicating that the event has an intermediate degree of influence, a significant type indicating that the event has no or little influence, or an unknown type indicating that the event is one whose severity level is not known.

According to an embodiment, the certainty type indicated by the certainty type information may include at least one of an observed type indicating that the event is certainly likely to happen or is one that has occurred and is progress, likely information indicating that the event is one whose probability of occurrence is 50% or more, a possible type indicating that the event is one whose probability of occurrence is 50% or less, an unlikely type indicating that the event is one whose probability of occurrence is nearly zero, or an unknown type indicating that the event is one whose certainty level is not known.

Rich media (RM) information: A field used when rich media is transmitted. The RM information field may include information about the rich media transmitted through the ITS-EAS message or ITS-RM message. In the disclosure, the RM information field may be referred to as an RM-related information field.

FIG. 16 illustrates a rich media (RM) information field according to an embodiment of the disclosure. FIG. 16(a) illustrates the structure of the RM information field, and FIG. 16(b) illustrates the ASN.1 representation of the RM information field. In the embodiment of FIG. 16, the RM information fields may be the RM information fields included in the EAS container of FIG. 14.

Referring to FIG. 16, the RM information fields may include a content type (ContentType), an access type (AccessType), a protocol type (ProtocolType), and/or a channel information (ChannelInfor). Each part/field is described below.

Content type: A field indicating the type of content transmitted via rich media. The content type field may be used to previously indicate the type of content transmitted via rich media. Table 2 shows an example ASN.1 representation of the content type field.

TABLE 2

| ASN.1 Representation | |
|---|---|
| DE_RichMediaContentType | ::= ENUMERATED { |
| None | (1), |
| Picture | (2), |
| Audio | (3), |
| Video | (4), |
| HTML | (5), |
| XML | (6), |
| URL | (7), |
| } | |

Referring to FIG. 2, the content type field may be defined as enumerated type of data element (DE_RichMediaContentType). For example, when there is no rich media associated with the EAS message, the content type field may be set to a first value (e.g., "1") indicating 'None.' When the rich media associated with the EAS message is a photo, audio, video, XML, or HTML, the content type field may be set to a value (e.g., "2" to "6") indicating a value indicating the photo, audio, video, XML, or HTML. When the rich media associated with the EAS message is received via the Internet, the content type field may be set to a value (e.g., "7") indicating the URL for receiving the rich media.

Access type: A field indicating the type of access layer where rich media is transmitted. The access type field may be used to indicate the type of access technology (communication access technology) for transmitting or receiving rich media data (the ITS message (e.g., ITS-EAS message or ITS-RM message) including rich media data). Through the access type field, the reception ITS station may be aware whether the EAS message and rich media data are transmitted via a single channel or multiple channels and, when transmitted via multiple channels, the number of transmitters/receivers of the transmission ITS station used for multi-channel operation. Based thereupon, the reception ITS station may determine what way it is to perform multi-channel operation in, depending on the number of its transmitters/receivers. As such, since the transmission scheme of ITS message is varied depending on the number of transmitters/receivers of the transmission ITS station, the transmission ITS station needs to transmit the information to the reception ITS station.

Table 3 shows an example ASN.1 representation of the access type field.

TABLE 3

| ASN.1 Representation | |
|---|---|
| DE_RichMediaAccessType | ::= ENUMERATED { |
| WAVE_Direct | (1), |
| WAVE_MCO_T1xR1 | (2), |
| WAVE_MCO_T2xR1 | (3), |
| WAVE_MCO_T2xR2 | (4), |
| Reserved | |
| . . . | |
| } | |

Referring to FIG. 3, the access type field may be defined as enumerated type of data element (DE_RichMediaAccessType).

When the EAS message/data and its associated RM data are transmitted via the same channel (single channel), the access type field may be set to a value (e.g., "1") indicating ITS_Direct (WAVE_Direct). For example, when the transmission type is the first transmission type, the rich media data, along with its associated EAS message, is included in the ITS-EAS message that may then be transmitted via the safety channel (e.g., CCH channel). In this case, the access type field may be set to a value indicating ITS_Direct (Wave_Direct).

Or, when the EAS message/data and its associated RM data are transmitted via different channels (multiple channels), and one transmitter and one receiver are used for multi-channel operation, the access type field may be set to a value (e.g., "2") indicating ITS_MCO_T1R1 (WAVE_MCO_T1XR1). For example, when the transmission type is the second or third transmission type, the EAS message may be included in the ITS-EAS message and be transmitted via the safety channel (e.g., the CCH channel), and the RM data associated with the EAS message may be included in the ITS-RM message and be transmitted via the non-safety channel (e.g., the SCH channel). At this time, one transmitter and one receiver of the transmission ITS station may be used for this multi-channel operation. That is, the transmission ITS station may perform multi-channel operation using one transceiver. In this case, the access type field may be set to a value indicating ITS_MCO_T1R1 (WAVE_MCO_T1xR1).

Or, when the EAS message/data and its associated RM data are transmitted via different channels (multiple channels), and two transmitters and one receive are used for multi-channel operation, the access type field may be set to a value (e.g., "3") indicating ITS_MCO_T2R1 (WAVE_MCO_T2xR1). For example, when the transmission type is the second or third transmission type, the EAS message may be included in the ITS-EAS message and be transmitted via the safety channel (e.g., the CCH channel), and the RM data associated with the EAS message may be included in the ITS-RM message and be transmitted via the non-safety channel (e.g., the SCH channel). At this time, two transmitters and one receiver of the transmission ITS station may be used for this multi-channel operation. In this case, the access type field may be set to a value indicating ITS_MCO_T2R1(WAVE_MCO_T2xR1).

Or, when the EAS message/data and its associated RM data are transmitted via different channels (multiple channels), and two transmitters and two receivers are used for multi-channel operation, the access type field may be set to a value (e.g., "4") indicating ITS_MCO_T2R2 (WAVE_MCO_T2XR2). For example, when the transmission type is the second or third transmission type, the EAS message may be included in the ITS-EAS message and be transmitted via the safety channel (e.g., the CCH channel), and the RM data associated with the EAS message may be included in the ITS-RM message and be transmitted via the non-safety channel (e.g., the SCH channel). At this time, two transmitters and two receivers may be used for this multi-channel operation. That is, the transmission ITS station may perform multi-channel operation using two transceivers. In this case, the access type field may be set to a value indicating ITS_MCO_T2R2(WAVE_MCO_T2xR2).

Protocol type (or transmission type): A field indicating the type of the protocol in which rich media is transmitted. The protocol type field may be used to indicate the type of communication protocol for transmitting or receiving rich media data (the ITS message (e.g., ITS-EAS message or ITS-RM message) including rich media data). Table 4 shows an example ASN.1 representation of the protocol type field.

TABLE 4

| ASN.1 Representation | |
| --- | --- |
| DE_RichMediaProtocolType | ::= ENUMERATED { |
| Type1 | (0), |
| Type2 | (1), |
| Type3 | (2), |
| reserved | |
| } | |

Referring to Table 4, the protocol type field may be defined as enumerated type of data element (DE_RichMediaProtocolType). When the communication protocol is of the first to third type, the protocol type field may be set to a value (e.g., "1" to "3") indicating the first type to third type. At this time, the first type to third type of the communication protocol are the same as the first type to the third type of the transmission types described above in connection with FIG. 17.

Channel information: A field indicating the channel of access layer where rich media is transmitted. The channel information field may be used to indicate the ITS channel for transmitting or receiving rich media data (the ITS message (e.g., the ITS-EAS message or ITS-RM message) including rich media data). Table 5 shows an example ASN.1 representation of channel information.

TABLE 5

| ASN.1 Representation | | |
| --- | --- | --- |
| DF_RichMediaChannelInfo | ::= ENUMERATED { | |
| 172 | (0), | -- 10 MHz |
| 174 | (1), | -- 10 MHz |
| 175 | (2), | -- 20 MHz |
| 176 | (3), | -- 10 MHz |
| 178 | (4), | -- 10 MHz |
| 180 | (5), | -- 10 MHz |
| 181 | (6), | -- 20 MHz |
| 182 | (7), | -- 10 MHz |
| 184 | (8), | -- 10 MHz |
| } | | |

Referring to Table 5, the channel information field may be defined as enumerated type of data element (DE_RichMediaChannelInfor). An ITS channel using 5.9 GHz may be used for transmission of rich media, and the channel information field may be set to a value indicating each channel (channel number). For example, the channel information field may be used to indicate the safety channel (CCH channel) or non-safety channel (SCH channel) used for transmission of rich media data.

FIG. 17 illustrates a rich media (RM) container according to an embodiment of the disclosure. FIG. 17(a) illustrates the structure of the RM container, and FIG. 17(b) illustrates the ASN.1 representation of the RM container. In the embodiment of FIG. 17, the RM container may be an RM container included in the ITS-RM message of FIG. 13(a) or (b).

Referring to FIG. 17, the RM container may include an RM header and/or rich media (RM) data. Each part/field is described below.

RM header: A field indicating the configuration of RM data.

RM data: An optional field added in the case of the second transmission type or third transmission type described above in connection with FIG. 11. According to an embodiment, the RM data field may include the whole or part of rich media data received from the EAS alert system. According to an embodiment, the RM data field may be defined as an octet string and may include rich media data in the form of a binary file.

FIG. 18 illustrates an RM header according to an embodiment of the disclosure. FIG. 18(a) illustrates the structure of the RM header, and FIG. 18(b) illustrates the ASN.1 representation of the RM header. In the embodiment of FIG. 18, the RM header may be the RM header included in the RM container of FIG. 17.

Referring to FIG. 18, the RM header may include a message ID, fast EAS, content type, and/or file format. Each part/field is described below.

Message ID: A field for indicating the ID for identifying the EAS message associated with rich media. To match the EAS message with its related rich media, the message ID in the EAS header of the ITS-EAS message and the message ID in the RM header of the ITS-RM message may have the same value. With this, the ITS-EAS message including the EAS message and the ITS-RM message including the rich media data associated with the EAS message may be matched to each other.

Fast EAS: A field for quickly receiving the EAS message. For example, this field may be used to quickly receive summary information about the EAS message. This is the same as that described above in connection with FIG. 21.

Content type: A field indicating the type of content transmitted via rich media. The content type field may be used to previously indicate the type of content transmitted via rich media. This is the same as that described above in connection with FIG. 16.

File format: A field indicating the format of rich media data. Table 6 shows an example ASN.1 representation of the file format field.

TABLE 6

ASN.1 Representation

| DE_FileFormat | ::= ENUMERATED { |
|---|---|
| JPG | (0), |
| PNG | (1), |
| WAV | (2), |
| MP3 | (4), |
| MP4 | (5), |
| HTML | (6), |
| XML | (7), |
| ... | |
| } | |

Referring to Table 6, the file format field may be defined as enumerated type of data element (DE_FileFormat). For example, when the rich media data is of JPG, PNG, WAV, MP3, MP4, HTML or XML, this field may be set to a value (e.g., "0" to "7") indicating JPG, PNG, WAV, MP3, MP4, HTML or XML.

The operation structure of an ITS station (V2X communication device) transmitting/receiving an EAS message or its associated rich media data is described below. First, referring to FIGS. 19 to 22, the operation structure of an ITS station (V2X communication device) using a single channel transmission scheme (mode) is described. Further, the operation structure of an ITS station (V2X communication device) using a single transceiver on multiple channels is described with reference to FIGS. 23 to 26. Further, the operation structure of an ITS station (V2X communication device) using multiple transceivers on multiple channels is described with reference to FIGS. 27 to 30.

Single Channel Transmission Scheme

FIG. 19 illustrates a method of transmitting an EAS message and rich media data via a single channel according to an embodiment of the disclosure. FIG. 20 illustrates a method of transmitting and receiving EAS data and rich media data via a single channel by a transmission ITS station and a reception ITS station according to an embodiment of the disclosure.

In the embodiment of FIGS. 19 and 20, the transmission ITS station may be a roadside ITS station (RIS), and the reception ITS station may be a vehicle ITS station (VIS). In the embodiment of FIGS. 19 and 20, the transmission type for transmission of the EAS message and rich media data is assumed to be the first transmission type. Thus, a single safety channel (CCH channel) may be used to transmit the EAS message and rich media data.

Referring to FIGS. 19 and 20, at t1, the transmission ITS station may generate an ITS-EAS message including the EAS message and transmit the ITS-EAS message through the CCH channel. At this time, the ITS-EAS message may not include rich media data. The reception ITS station may access the CCH channel, receive the ITS-EAS message, and obtain the EAS message from the ITS-EAS message.

At t2, the transmission ITS station may generate an ITS-EAS message including the EAS message and transmit the ITS-EAS message through the CCH channel. At this time, the ITS-EAS message may include rich media data associated with the EAS message. The reception ITS station may access the CCH channel, receive the ITS-EAS message, and obtain the EAS data and rich media data from the ITS-EAS message.

At t1 and t4, like at t1, the transmission ITS station may generate an ITS-EAS message including no rich media data and transmit the ITS-EAS message through the CCH channel. The reception ITS station may access the CCH channel, receive the ITS-EAS message, and obtain the EAS data from the ITS-EAS message. Meanwhile, after t4, the ITS-EAS message may be periodically transmitted.

As such, the ITS-EAS message including the EAS message may be periodically transmitted. Meanwhile, rich media data may be transmitted event occurrence-wise when the data exists. For example, in the case of the first transmission type, the rich media data, along with the EAS message included in the ITS-EAS message, may be transmitted via the CCH channel when the data exists. In this case, for the reception ITS station to stably receive messages, the transmission ITS station may periodically retransmit the ITS-EAS message including the EAS message a predetermined period after the event of transmission of rich media occurs.

FIG. 21 is a flowchart illustrating a method of transmitting EAS data and rich media data via a single channel by a transmission ITS station according to an embodiment of the disclosure. In the embodiment of FIG. 21, the transmission ITS station may be the transmission ITS station of FIG. 27.

Referring to FIG. 21, the transmission ITS station may initialize the system for first providing the EAS service.

The transmission ITS station may receive the EAS signal. For example, the transmission ITS station may receive the EAS signal from the EAS alert system. According to an embodiment, the EAS signal may include the EAS message and/or its associated rich media data. In this case, the transmission ITS station may update EA-related information using the EAS message and rich media data.

The transmission ITS station may determine whether an ITS message (ITS-EAS message) including the EAS information is generated. According to an embodiment, the transmission ITS station may identify the time of transmission of the ITS-EAS message and determine whether to generate an ITS-EAS message based on the time of transmission.

Upon determining to generate an ITS-EAS message, the transmission ITS station may generate an EAS container. According to an embodiment, in the case of the first transmission type, the EAS container may include an EAS header and EAS data and may optionally including RM data. The transmission ITS station may determine whether there is rich media associated with the EAS message and, if any, the transmission ITS station may add the data of the rich media to the EAS container.

The transmission ITS station may generate an ITS-EAS message. According to an embodiment, the ITS-EAS message may generate an ITS-EAS message by adding an ITS message header or common header to the EAS container.

The transmission ITS station may transmit the ITS-EAS message. The transmission ITS station may perform networking/transport layer processing and access layer processing on the generated ITS-EAS message and transmit a radio signal including the ITS-EAS message through the safety channel (CCH channel).

FIG. 22 is a flowchart illustrating a method of receiving EAS data and rich media data via a single channel by a reception ITS station according to an embodiment of the disclosure. In the embodiment of FIG. 22, the reception ITS station may be the ITS station of FIG. 20. The reception ITS station may perform the operations of the transmission ITS station in a reverse order thereof.

Referring to FIG. 22, the reception ITS station may initialize the system for providing an EAS service.

The reception ITS station may receive, or wait to receive, an ITS-EAS message. According to an embodiment, the reception ITS station may receive the radio signal including the ITS-EAS message via the safety channel (CCH channel) and perform access layer processing and networking/transport layer processing on the radio signal, thereby receiving/obtaining the ITS-EAS message.

The reception ITS station may parse the ITS-EAS message. By so doing, the reception ITS station may obtain the data of the ITS-EAS message.

The reception ITS station may determine whether the ITS-EAS message includes RM data. As described above, the RM data may be included in the EAS container in the ITS-EAS message. According to an embodiment, the ITS-EAS message may include an RM flag field indicating whether the ITS-EAS message includes RM data. For example, the RM flag field may be included in the EAS header in the EAS container. In this case, the reception ITS station may determine whether the ITS-EAS message includes RM data based on the RM flag field.

Unless the ITS-EAS message includes RM data (i.e., when the EAS container includes only EAS header and EAS data), the reception ITS station may obtain the EAS data from the EAS container. The EAS data may be transferred to and processed by the application layer. By so doing, the EAS message may be provided to the user.

When the EAS container includes RM data (i.e., when the EAS container includes the EAS header, EAS data, and RM data), the reception ITS station may obtain the EAS data and RM data from the EAS container. The EAS data and RM data may be transferred to and processed by the application layer. By so doing, the EAS message and its associated rich media may be provided to the user.

Transmission Scheme Using a Single Transceiver on Multiple Channels

FIG. 23 illustrates a method of transmitting an EAS message and rich media data using a single transceiver on multiple channels according to an embodiment of the disclosure. FIG. 24 illustrates a method of transmitting and receiving EAS data and rich media data using a single transceiver on multiple channels by a transmission ITS station and a reception ITS station according to an embodiment of the disclosure.

In the embodiment of FIGS. 23 and 24, the transmission ITS station may be a roadside ITS station (RIS), and the reception ITS station may be a vehicle ITS station (VIS). Further, in the embodiment of FIGS. 23 and 24, the transmission type for transmission of rich media data is assumed to be the second or third transmission type. Thus, the safety channel (CCH channel) may be used for transmission of the EAS message, and the non-safety channel (SCH channel) may be used for transmission of rich media data.

For the ITS station with a single transceiver to efficiently transmit or receive the EAS message and rich media data using multiple channels, the alternating mode to periodically alternate CCH and SCH may be used as channel coordination mode of multi-channel operation. As described above, in the alternating mode, the ITS station may receive safety-related information during a CCH interval (time slot 0), and the ITS station may perform service/information exchange between the service provider and user during an SCH interval (time slot 1). In altering mode, the ITS station may alternately perform communication via the CCH and SCH during a configured CCH interval and SCH interval.

Thus, the ITS station may transmit or receive the ITS-EAS message via the CCH channel during the CCH interval and then switch to the SCH channel, transmitting or receiving the ITS-RM via the SCH channel during the SCH interval. This process may be repeated per sync interval including the CCH interval and SCH interval. To that end, the transmission ITS station and reception ITS station may be synchronized with each other.

In the embodiment of FIGS. 23 and 24, the CCH interval (time slot 1) is assumed to correspond to the time t1 to t4, and the SCH interval (time slot 2) is assumed to correspond to the time t4 to t5. After time t5, the CCH interval (time slot 0) is assumed to commence.

Referring to FIGS. 23 and 24, at t1, the transmission ITS station and reception ITS station need to access the CCH channel. The transmission ITS station may transmit the ITS-EAS message via the CCH channel during the CCH interval. At this time, the ITS-EAS message may not include a rich media information field (RM infor). The reception ITS station may receive the ITS-EAS message via the CCH channel and obtain the EAS message from the ITS-EAS message.

At t2 within the CCH interval, the transmission ITS station may transmit the ITS-EAS message via the CCH channel. At this time, the ITS-EAS message may include the rich media information field (RM infor) to efficiently operate transmission of rich media. The reception ITS station may access the CCH channel, receive the ITS-EAS message and obtain the EAS data and data of the rich media information field from the ITS-EAS message. As described above, the rich media information field may include, e.g., channel information indicating the channel where the rich media is transmitted.

At t3 within the CCH interval, like at t1, the transmission ITS station may transmit an ITS-EAS message lacking the rich media information field via the CCH channel. The reception ITS station may access the CCH channel, receive the ITS-EAS message, and obtain the EAS data from the ITS-EAS message.

At t4, the transmission ITS station and reception ITS station need to change the channel and access the SCH channel. At this time, the reception ITS station may access the SCH channel for reception of the ITS-RM message based on the channel information in the rich media information field included in the ITS-EAS message. The transmission ITS station may transmit the ITS-RM message via the SCH channel during the SCH interval. The reception ITS station may receive the ITS-RM message via the SCH channel and obtain rich media data (EAS rich media) from the ITS-RM message.

At t5, the transmission ITS station and reception ITS station need to again access the CCH channel. Thereafter, the transmission ITS station may transmit the ITS-EAS message via the CCH channel during the CCH interval, and the reception ITS station may receive the ITS-EAS message via the CCH channel.

FIG. 25 is a flowchart illustrating a method of transmitting EAS data and rich media data using a single transceiver on multiple channels by a transmission ITS station according to an embodiment of the disclosure. In the embodiment of FIG. 25, the transmission ITS station may be the transmission ITS station of FIG. 24.

Referring to FIG. 25, the transmission ITS station may initialize the system for first providing the EAS service.

The transmission ITS station may receive the EAS signal. For example, the transmission ITS station may receive the EAS signal from the EAS alert system. According to an embodiment, the EAS signal may include the EAS message and/or its associated rich media data. In this case, the transmission ITS station may update EA-related information using the EAS message and rich media data.

The transmission ITS station may determine whether an ITS message (ITS-EAS message) including the EAS information is generated. According to an embodiment, the transmission ITS station may identify the time of transmission of the ITS-EAS message and determine whether to generate an ITS-EAS message based on the time of transmission.

Upon determining to generate an ITS-EAS message, the transmission ITS station may determine the type of transmission message.

When the type of transmission message is the ITS-EAS message, the transmission ITS station may generate an EAS container. According to an embodiment, in the case of second or third transmission type, the EAS container includes the EAS header and EAS data but not RM data.

The transmission ITS station may generate an ITS-EAS message. According to an embodiment, the ITS-EAS message may generate an ITS-EAS message by adding an ITS message header or common header to the EAS container.

The transmission ITS station may transmit the ITS-EAS message via the CCH channel during the CCH interval. According to an embodiment, the transmission ITS station may perform networking/transport layer processing and access layer processing on the generated ITS-EAS message and transmit a radio signal including the ITS-EAS message via the CCH channel during the CCH interval.

When the type of transmission message is the ITS-RM message, the transmission ITS station may generate an RM container.

The transmission ITS station may generate an ITS-RM message. According to an embodiment, the ITS-EAS message may generate an ITS-RM message by adding an ITS message header or common header to the RM container.

The transmission ITS station may transmit the ITS-RM message via the SCH channel during the SCH interval. According to an embodiment, the transmission ITS station may perform networking/transport layer processing and access layer processing on the generated ITS-RM message and transmit a radio signal including the ITS-RM message via the SCH channel during the SCH interval.

FIG. 26 is a flowchart illustrating a method of receiving EAS data and rich media data using a single transceiver on multiple channels by a reception ITS station according to an embodiment of the disclosure. In the embodiment of FIG. 26, the reception ITS station may be the ITS station of FIG. 25. The reception ITS station may perform the operations of the transmission ITS station in a reverse order thereof.

Referring to FIG. 26, the reception ITS station may initialize the system for providing an EAS service.

The reception ITS station may determine the MCO slot. According to an embodiment, the reception ITS station may determine the MCO slot according to channel coordination mode. When the channel coordination mode is the alternating mode, the reception ITS station may determine whether the MCO slot is time slot 0, which corresponds to the CCH interval, or time slot 1, which corresponds to the SCH interval.

When the MCO slot is time slot 0, the reception ITS station may receive, or wait to receive, an ITS-EAS message. According to an embodiment, the reception ITS station may receive the radio signal including the ITS-EAS message via the safety channel (CCH channel) and perform access layer processing and networking/transport layer processing on the radio signal, thereby receiving/obtaining the ITS-EAS message.

The reception ITS station may parse the ITS-EAS message. By so doing, the reception ITS station may obtain the data of the ITS-EAS message.

The reception ITS station may determine whether the ITS-EAS message includes the RM information field. As described above, the RM information field may be included in the EAS header in the ITS-EAS message.

When the ITS-EAS message lacks the RM information field, the reception ITS station may obtain the EAS message. The EAS message may be transferred to and processed by the application layer. By so doing, the EAS message may be provided to the user.

When the ITS-EAS message includes the RM information field, the reception ITS station may obtain the EAS message and RM information. The EAS message may be transferred to and processed by the application layer. By so doing, the EAS message may be provided to the user. Further, upon switching to the SCH interval (time slot 1), the RM information may be used for the reception ITS station to select the SCH channel where rich media data is transmitted.

When the MCO slot is time slot 1, the reception ITS station may receive, or wait to receive, an ITS-RM message. According to an embodiment, the reception ITS station may receive the radio signal including the ITS-RM message via the safety channel (SCH channel) and perform access layer processing and networking/transport layer processing on the radio signal, thereby receiving/obtaining the ITS-RM message. When the time slot switches from 0 to 1, the reception ITS station may turn the channel into the SCH channel where the ITS-RM message is transmitted based on the RM information field.

The reception ITS station may parse the ITS-RM message. By so doing, the reception ITS station may obtain the data of the ITS-RM message.

The reception ITS station may obtain RM data. The RM data may be transferred to and processed by the application layer. By so doing, the EAS message and its associated rich media may be provided to the user.

When the EAS message and its associated rich media data are transmitted or received using one transceiver on multiple channels, synchronization for MCO needs to precisely be performed between the transmission ITS station and the reception ITS station. If synchronization is not done precisely, the reception ITS station may fail to receive critical EA-related information, harming vehicle safety.

Described below is a method of transmitting or receiving the EAS message and its associated rich media data using multiple transceivers on multiple channels to address such issues.

Transmission Scheme Using Multiple Transceivers on Multiple Channels

FIG. 27 illustrates a method of transmitting an EAS message and rich media data using multiple transceivers on multiple channels according to an embodiment of the disclosure. FIG. 28 illustrates a method of transmitting and receiving EAS data and rich media data using multiple transceivers on multiple channels by a transmission ITS station and a reception ITS station according to an embodiment of the disclosure. In the embodiment of FIGS. 27 and 28, the ITS station is assumed to have two transceivers.

In the embodiment of FIGS. 27 and 28, the transmission ITS station may be a roadside ITS station (RIS), and the reception ITS station may be a vehicle ITS station (VIS). Further, in the embodiment of FIGS. 27 and 28, the transmission type for transmission of rich media data is assumed to be the second or third transmission type. Thus, the safety channel (CCH channel) may be used for transmission of the EAS message, and the non-safety channel (SCH channel) may be used for transmission of rich media data.

For the ITS station with multiple transceivers to efficiently transmit or receive the EAS message and rich media data using multiple channels, the ITS station may set one transceiver to continuously access the CCH channel instead of using the above-described alternating mode.

Thus, the ITS station may continuously transmit or receive the ITS-EAS message via the CCH channel without changing channels using the transceiver fixed to one CCH channel. The ITS station may transmit or receive ITS-RM messages while switching SCH channels using other transceiver.

Referring to FIGS. 27 and 28, transceiver #1 (TX1) of the transmission ITS station and transceiver #1 (RX1) of the reception ITS station may remain linked to the CCH channel. Further, transceiver #2 (TX2) of the transmission ITS station and transceiver #2 (RX2) of the reception ITS station may access the SCH channel where rich media data is transmitted while switching channels.

At t1, t2, t3, t4, t5, t6, and t7, the transmission ITS station may transmit the ITS-EAS message via the CCH channel using transceiver #1 (TX1). At this time, the ITS-EAS message may, or may not, include the rich media information field (RM infor). The reception ITS station may receive the ITS-EAS message via the CCH channel using transceiver #1 (RX1) and obtain the EAS data and/or data of the rich media information field from the ITS-EAS message.

After t2, transceiver #2 (RX2) of the transmission ITS station and transceiver #2 (RX2) of the reception ITS station may switch the channel to the SCH channel for transmitting or receiving rich media data. At this time, the reception ITS station may access the SCH channel for reception of the ITS-RM message based on the channel information in the rich media information field included in the ITS-EAS message.

At times ta, tb, and tc, the transmission ITS station may transmit the ITS-RM message via the SCH channel. The reception ITS station may receive the ITS-RM message via the SCH channel and obtain rich media data (EAS rich media) from the ITS-RM message.

FIG. 29 is a flowchart illustrating a method of transmitting EAS data and rich media data using multiple transceivers on multiple channels by a transmission ITS station according to an embodiment of the disclosure. In the embodiment of FIG. 29, the transmission ITS station may be the transmission ITS station of FIG. 28.

Referring to FIG. 29, the transmission ITS station may initialize the system for first providing the EAS service.

The transmission ITS station may receive the EAS signal. For example, the transmission ITS station may receive the EAS signal from the EAS alert system. According to an embodiment, the EAS signal may include the EAS message and/or its associated rich media data. In this case, the transmission ITS station may update EA-related information using the EAS message and rich media data.

The transmission ITS station may determine whether to generate an ITS-EAS message or ITS-RM message. According to an embodiment, the transmission ITS station may identify the time of transmission of message and determine whether to generate an ITS-EAS message or ITS-RM message based on the time of transmission.

Upon determining to generate an ITS-EAS message, the transmission ITS station may generate an EAS container. According to an embodiment, in the case of second or third transmission type, the EAS container includes the EAS header and EAS data but not RM data.

The transmission ITS station may generate an ITS-EAS message. According to an embodiment, the ITS-EAS message may generate an ITS-EAS message by adding an ITS message header or common header to the EAS container.

The transmission ITS station may transmit the ITS-EAS message via the CCH channel using the first transceiver TX1. According to an embodiment, the transmission ITS station may perform networking/transport layer processing and access layer processing on the generated ITS-EAS message and transmit a radio signal including the ITS-EAS message via the CCH channel Here, the first transceiver may be a transceiver that remains attached to the CCH channel.

Upon determining to generate an ITS-RM message, the transmission ITS station may generate an RM container.

The transmission ITS station may generate an ITS-RM message. According to an embodiment, the ITS-EAS message may generate an ITS-RM message by adding an ITS message header or common header to the RM container.

The transmission ITS station may transmit the ITS-RM message via the SCH channel using a second transceiver (TX1) different from the first transceiver. According to an embodiment, the transmission ITS station may perform networking/transport layer processing and access layer processing on the generated ITS-RM message and transmit a radio signal including the ITS-RM message via the SCH channel during the SCH interval.

FIG. 30 is a flowchart illustrating a method of receiving EAS data and rich media data using multiple transceivers on multiple channels by a reception ITS station according to an embodiment of the disclosure. In the embodiment of FIG. 30, the reception ITS station may be the ITS station of FIG. 29. The reception ITS station may perform the operations of the transmission ITS station in a reverse order thereof.

Referring to FIG. 30, the reception ITS station may initialize the system for providing an EAS service.

The reception ITS station may turn the first transceiver RX1 to the CCH channel.

The reception ITS station may receive, or wait to receive, the ITS-EAS message using the first transceiver. According to an embodiment, the reception ITS station may receive the radio signal including the ITS-EAS message via the safety channel (CCH channel) using the first transceiver and perform access layer processing and networking/transport layer processing on the radio signal, thereby receiving/obtaining the ITS-EAS message.

The reception ITS station may parse the ITS-EAS message. By so doing, the reception ITS station may obtain the data of the ITS-EAS message.

The reception ITS station may determine whether the ITS-EAS message includes the RM information field. As described above, the RM information field may be included in the EAS header in the ITS-EAS message.

When the ITS-EAS message lacks the RM information field, the reception ITS station may obtain the EAS message. The EAS message may be transferred to and processed by the application layer. By so doing, the EAS message may be provided to the user.

When the ITS-EAS message includes the RM information field, the reception ITS station may obtain the EAS message and RM information. The EAS message may be transferred to and processed by the application layer. By so doing, the EAS message may be provided to the user. Further, the RM information may be used for the second transceiver RX2 of the reception ITS station to select the SCH channel where the rich media data is transmitted.

The reception ITS station may receive, or wait to receive, the ITS-RM message using the second transceiver. According to an embodiment, the reception ITS station may receive the radio signal including the ITS-RM message via the safety channel (SCH channel) using the second transceiver and perform access layer processing and networking/transport layer processing on the radio signal, thereby receiving/obtaining the ITS-RM message.

The reception ITS station may parse the ITS-RM message. By so doing, the reception ITS station may obtain the data of the ITS-RM message.

The reception ITS station may obtain RM data. The RM data may be transferred to and processed by the application layer. By so doing, the EAS message and its associated rich media may be provided to the user.

FIG. 31 illustrates a configuration of a V2X communication device according to an embodiment of the disclosure.

Referring to FIG. 31, a V2X communication device 31000 may include at least one communication unit 31010, a processor 31020, and a memory 31030.

The communication unit 31010 may be connected with the processor 31020 to transmit/receive wireless signals. The communication unit 31010 may up-convert data received from the processor 31020 into a transmission/reception band and transmit the signal or may down-convert the received signal. The communication unit 31010 may implement the operation of at least one of the physical layer or access layer.

The communication unit 31010 may also include a plurality of sub RF units to perform communication according to a plurality of communication protocols. According to an embodiment, the communication unit 31010 may perform data communication based on, e.g., dedicated short range communication (DSRC), IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology. The communication unit 31010 may include a plurality of transceivers implementing each communication technology.

The communication unit 31010 may include a plurality of transceivers, with one transceiver communicating on the CCH, and the other on the SCH. The communication unit 31010 may perform multi-channel operation using the plurality of transceivers.

The processor 31020 may be connected with the RF unit 31030 to implement the operation of the layers according to the ITS system or WAVE system. The processor 31020 may be configured to perform operations according to various embodiments of the disclosure as described with reference to the drawings. Further, according to various embodiments of the disclosure, at least one of a module, data, program, or software for implementing the operation of the V2X communication device 31000 may be stored in the memory 31010 and be executed by the processor 31020.

The memory 31010 is connected with the processor 31020 to store various pieces of information for driving the processor 31020. The memory 31010 may be included in the processor 31020 or be installed outside the processor 31020 and connected with the processor 31020 via a known means.

Described below is a method for a V2X communication device to receive an ITS message according to an embodiment of the disclosure. As described above, the V2X communication device may be denoted as an ITS station/device. The specific description made above in connection with each figure may be applied to each step.

First, the V2X communication device may access the control channel (CCH).

Next, the V2X communication device may receive a first ITS message including EAS information on the control channel.

Then, the V2X communication device may obtain EAS information from the first ITS message. According to an embodiment, the first ITS message can include a rich media information field including information on rich media related with the EAS information, and the rich media information field can include transmission type information indicating a data transmission type of the rich media and channel information indicating an ITS channel through which data of the rich media is transmitted.

According to an embodiment, when the transmission type is a first transmission type indicating that the data of the rich media is transmitted in the first ITS message, the V2X communication device may obtain the data of the rich media from the first ITS message.

According to another embodiment, when the transmission type is a second transmission type indicating that the data of the rich media is transmitted in a second ITS message, and the second ITS message is processed via the same communication protocol as the first ITS message, the V2X communication device may access a service channel (SCH) for receiving the second ITS message based on the channel information, receive the second ITS message including the data of the rich media via the service channel, and obtain the data of the rich media from the second ITS message.

According to an embodiment, communication via the control channel may be performed during a CCH interval which is a time slot for communication of control information by a first transceiver of the V2X communication device, and communication via the service channel may be performed during an SCH interval which is a time slot for communication of service information by the first transceiver.

According to another embodiment, communication via the control channel may be performed by a first transceiver of the V2X communication device, and communication via the service channel may be performed by a second transceiver of the V2X communication device.

According to an embodiment, the rich media information field may further include content type information indicating a type of content transmitted via the rich media and access type information indicating a type of access technology for transmission or reception of the data of the rich media.

According to an embodiment, the first ITS message may further include an EAS field providing summary information used to quickly receive the EAS information, and wherein the EAS field includes message type information indicating a type of the EAS information, event type information indicating a type of an event associated with the EAS information, emergency information indicating an emergency of the event, or risk information indicating a risk of the event.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

Modes to Practice the Disclosure

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The disclosure sets forth both devices and methods, and descriptions thereof may be complementarily applicable to each other.

Various embodiments have been described in the best mode for practicing the disclosure.

INDUSTRIAL AVAILABILITY

The disclosure is used in a series of V2X communication fields.

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The invention claimed is:

1. A method of receiving an intelligent transport system (ITS) message by a V2X communication device, the method comprising:
   accessing a control channel (CCH);
   receiving a first ITS message including emergency alert system (EAS) information via the control channel,
   wherein the first ITS message further includes a rich media information field including information about rich media associated with the EAS information, and
   wherein the information about the rich media includes transmission type information indicating a transmission type for rich media data and channel information indicating an ITS channel via which the rich media data is transmitted,
   wherein the transmission type information includes a first transmission type and a second transmission type,
   wherein the first transmission type represents that the rich media data is transmitted, on the CCH, in the first ITS message, and
   wherein the second transmission type represents that the rich media data is transmitted, on a service channel (SCH), in a second ITS message, and the second ITS message is processed via a same communication protocol as the first ITS message; and
   obtaining the rich media data from (i) the first ITS message or (ii) the second ITS message based on (i) the transmission type information and (ii) the channel information.

2. The method of claim 1, wherein, based on the transmission type being the first transmission type the rich media data is obtained from the first ITS message.

3. The method of claim 1, wherein based on the transmission type being the second transmission type, the method further comprising:
   accessing the SCH for receiving the second ITS message based on the channel information;
   receiving the second ITS message including the rich media data via the service channel; and
   obtaining the rich media data from the second ITS message.

4. The method of claim 3, wherein communication via the control channel is performed during a CCH interval which is a time slot for communication of control information by a first transceiver of the V2X communication device, and communication via the service channel is performed during an SCH interval which is a time slot for communication of service information by the first transceiver.

5. The method of claim 3, wherein communication via the control channel is performed by a first transceiver of the V2X communication device, and communication via the service channel is performed by a second transceiver of the V2X communication device.

6. The method of claim 1, wherein the rich media information field further includes content type information indicating a type of content transmitted via the rich media data and access type information indicating a type of access technology for transmission or reception of the rich media data.

7. The method of claim 1, wherein the first ITS message further includes an EAS field providing summary information used to receive the EAS information, and wherein the EAS field includes message type information indicating EAS information type, event type information indicating an event type associated with the EAS information, emergency information indicating an emergency associated with the event, or risk information indicating a risk associated with the event.

8. A V2X communication device receiving an intelligent transport system (ITS) message, comprising:
  at least one transceiver transmitting/receiving a communication signal; and
  a processor controlling the at least one transceiver, wherein
  the processor:
  accesses a control channel (CCH);
  receives a first ITS message including emergency alert system (EAS) information via the control channel,
    wherein the first ITS message includes a rich media information field including information about rich media associated with the EAS information, and wherein the rich media information field includes transmission type information indicating a transmission type for the rich media data and channel information indicating an ITS channel via which the rich media data is transmitted,
  wherein the transmission type information includes a first transmission type and a second transmission type,
  wherein the first transmission type represents that the rich media data is transmitted, on the CCH, in the first ITS message, and
  wherein the second transmission type represents that the rich media data is transmitted, on a service channel (SCH), in a second ITS message, and the second ITS message is processed via a same communication protocol as the first ITS message; and
  obtain the rich media data from (i) the first ITS message or (ii) the second ITS message based on (i) the transmission type information and (ii) the channel information.

9. The V2X communication device of claim 8, wherein, based on the transmission type being the first transmission type, the rich media data is obtained from the first ITS message.

10. The V2X communication device of claim 8, wherein based on the transmission type being the second transmission type, and the second ITS message is processed via the same communication protocol as the first ITS message, the processor further:
  accesses a service channel (SCH) for receiving the second ITS message based on the channel information;
  receives the second ITS message including the rich media data via the service channel; and
  obtains rich media data from the second ITS message.

11. The V2X communication device of claim 10, wherein communication via the control channel is performed during a CCH interval which is a time slot for communication of control information by a first transceiver of the V2X communication device, and communication via the service channel is performed during an SCH interval which is a time slot for communication of service information by the first transceiver.

12. The V2X communication device of claim 10, wherein communication via the control channel is performed by a first transceiver of the V2X communication device, and communication via the service channel is performed by a second transceiver of the V2X communication device.

13. The V2X communication device of claim 8, wherein the rich media information field further includes content type information indicating a type of content transmitted via the rich media data and access type information indicating a type of access technology for transmission or reception of the rich media data.

14. The V2X communication device of claim 8, wherein the first ITS message further includes an EAS field providing summary information used to receive the EAS information, and wherein the EAS field includes message type information indicating EAS information type, event type information indicating an event type associated with the EAS information, emergency information indicating an emergency associated with the event, or risk information indicating a risk associated with the event.

* * * * *